US012570778B2

(12) United States Patent (10) Patent No.: US 12,570,778 B2
Konaganti et al. (45) Date of Patent: Mar. 10, 2026

(54) ETHYLENE INTERPOLYMERS CATALYZED USING MIXED HOMOGENEOUS CATALYST FORMULATIONS

(71) Applicant: NOVA CHEMICALS (INTERNATIONAL) S.A., Fribourg (CH)

(72) Inventors: Vinod Konaganti, Calgary (CA);
Shivendra Goyal, Calgary (CA);
Sepideh Kasiri, Calgary (CA);
Bronwyn Gillon, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 508 days.

(21) Appl. No.: 18/041,051

(22) PCT Filed: Oct. 6, 2021

(86) PCT No.: PCT/IB2021/059182
§ 371 (c)(1),
(2) Date: Feb. 8, 2023

(87) PCT Pub. No.: WO2022/074590
PCT Pub. Date: Apr. 14, 2022

(65) Prior Publication Data
US 2023/0295355 A1 Sep. 21, 2023

Related U.S. Application Data

(60) Provisional application No. 63/089,204, filed on Oct. 8, 2020.

(51) Int. Cl.
*C08F 210/16* (2006.01)
*C08F 4/659* (2006.01)
*C08L 23/08* (2025.01)

(52) U.S. Cl.
CPC ........ *C08F 210/16* (2013.01); *C08F 4/65908* (2013.01); *C08F 4/65912* (2013.01); *C08L 23/08* (2013.01); *C08L 2205/025* (2013.01)

(58) Field of Classification Search
CPC .............. C08L 2205/025; C08L 23/08; C08L 23/0807; C08F 210/02; C08F 210/16; C08F 10/02
See application file for complete search history.

(56) References Cited

U.S. PATENT DOCUMENTS 5,376,439 A 12/1994 Hodgson et al.
2018/0305531 A1 10/2018 Zhang et al.
2018/0305532 A1 * 10/2018 Zhang ................. C08L 23/0815

FOREIGN PATENT DOCUMENTS

WO WO-2020/012303 A2 1/2020
WO WO-2020/012314 A2 1/2020

OTHER PUBLICATIONS

Ansari et al., "Rheology of Ziegler-Natta and metallocene high-density polyethylenes: broad molecular weight distribution effects", Rheol. Acta, vol. 50, 2011, pp. 17-27.
Ansari et al., "The role of microstructure on melt fracture of linear low density polyethylenes", Polymer Testing, vol. 67, 2018, pp. 266-274.
Arnett et al., "Zero-Shear Viscosity of Some Ethyl Branched Paraffinic Model Polymers", American Chemical Society; J. Phys. Chem. vol. 84, 1980, pp. 649-652.
ASTM D1003-13 Standard Test methods for Haze and Luminous transmittance of Transparent plastics—Copyright ASTM International—Current edition approved Nov. 15, 2013. Published Nov. 2013. Originally approved in 1949. Last previous edition approved in 2011 as D1003-1 (pp. 1-7).
ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).
ASTM D1709-09—Standard Test Methods for Impact Resistance of Plastic Film by the Free-Falling Dart Method Copyright ASTM International—Current edition approved May 1, 2009. Published Jun. 2009. Originally approved in 1959. Last previous edition approved in 2008 as D1709-08 (pp. 1-9).
ASTM D1922-09—Standard Test Method for Propagation Tear Resistance of Plastic Film and Thin Sheeting by Pendulum Method—Current edition approved May 1, 2009. Published Jun. 2009. Originally approved in 1961. Last previous edition approved in 2008 as D1922-08. (pp. 1-7).
ASTM D2457-13; Standard Test Method for Specular Gloss of Plastic Films and Solid Plastics; Current edition Approved Apr. 1, 2013. Published Apr. 2013. Originally approved in 1965. Last previous edition approved in 2008 as D2457-08. (pp. 1-6).

(Continued)

*Primary Examiner* — Kregg T Brooks
(74) *Attorney, Agent, or Firm* — Thomas J. Styslinger

(57) ABSTRACT

An ethylene interpolymer product comprises a first component with an undetectable level of long-chain branches and a second component with a detectable level of long-chain branches wherein said first component has a weight-average molecular weight higher than said second component. The ethylene interpolymer product is characterized as having (a) an Arrhenius type flow activation energy $E_a$ greater than or equal to 33 kJ/mol and less than or equal to 45 kJ/mol; and (b) a number-average relaxation time $t_n$ measured at 190° C. greater than or equal to 2 ms and less than or equal to 15 ms, wherein said number-average relaxation time is calculated using zero-shear viscosity $\eta_0$ at 190° C. in kPa·s and plateau modulus Formula (I) at 190° C. in MPa, according to Formula (II). Film made from the ethylene interpolymer product may be characterized by a hot-tack peak strength from about 12 N to about 20 N and a lubricated puncture resistance from about 100 J/mm to about 150 J/mm.

$$G_N^0 \quad \text{Formula (I)}$$

$$\tau_n = \frac{\eta_0}{G_N^0}. \quad \text{Formula (II)}$$

26 Claims, No Drawings

(56) References Cited

OTHER PUBLICATIONS

ASTM D4703-16—Standard Practice for Compression Molding Thermoplastic Materials into Test Specimens, Plaques, or Sheets—Copyright ASTM International—Current edition approved Apr. 1, 2016. Published Apr. 2016. Originally approved in 1991. Last previous edition approved in 2010 as D4703-10a. (pp. 1-13).

ASTM D5748-95—Standard Test Method for Protrusion Puncture Resistance of Stretch Wrap Film—Copyright ASTM International—Current edition approved Apr. 1, 2012. Published May 2012. Originally approved in 1995. Last previous edition approved in 2007 as D5748-95 (pp. 1-4).

ASTM D6474-12—Standard Test Method for Determining Molecular Weight Distribution and Molecular Weight Averages of Polyolefins by High Temperature Gel Permeation Chromatography—Copyright ASTM International—Current edition approved Dec. 15, 2012. Published Dec. 2012. Originally approved in 1999. Last previous edition approved in 2006 as D6474-99. (pp. 1-6).

ASTM D6645-01—Standard Test Method for Methyl (Comonomer) Content in Polyethylene by Infrared Spectrophotometry—Copyright ASTM International—Current edition approved Jan. 1, 2010. Published Jan. 2010. Originally approved in 2001. Last previous edition approved in 2001 as D6645-01 (pp. 1-4).

ASTM D792-13—Standard Test Method for Density and Specific Gravity (Relative Density) of Plastics by Displacement—Current edition approved Nov. 1, 2013. Published Nov. 2013. Originally approved in 1944. Last previous edition approved in 2008 as D792-08 (pp. 1-6).

ASTM D882-12—Standard Test Method for Tensile Properties of thin Plastic Sheeting—Copyright ASTM International Current edition approved Aug. 1, 2012. Published Sep. 2012. Originally approved in 1946. Last previous edition approved in 2010 as D882-10 (pp. 1-11).

Beer et al., High Molecular Weight Tail and Long-Chain Branching in SRM 1476 Polyethylene, J. Appl. Polym. Sci., vol. 73, 1999, pp. 2807-2812.

Bird et al., "Dynamics of Polymer Liquids. vol. 1: Fluid Mechanics", Wiley-Interscience Publications, 1987, pp. 169-175.

Graessley et al., "Effect of Long Branches on the Flow Properties of Polymers", Acc. Chem. Res., vol. 10, 1977, pp. 332-339.

International Search Report and Written Opinion of the International Searching Authority issued in PCT Application No. PCT/IB2021/059182, mailed date Feb. 12, 2021.

K. Yasuda (1979) PhD Thesis, IT Cambridge.

Karjala et al., "Detection of Low Levels of Long-Chain Branching in Polydisperse Polyethylene Materials", Journal of Applied Polymer Science, vol. 119, 2011, pp. 636-646.

Liu et al., "Evaluation of different methods for the determination of the plateau modulus and the entanglement molecular weight", Polymer 47, 2006, pp. 4461-4479.

Lohse et al., "Well-Defined, Model Long Chain Branched Polyethylene. 2. Melt Rheological Behavior", Macromolecules, vol. 35, 2002, pp. 3066-3075.

Nobile et al., "Evaluation of Molecular Weight Distribution from Dynamic Moduli", Rheol. Acta., vol. 40, 2001, pp. 111-119.

Randall et al., "A Review of High Resolution Liquid 13Carbon Nuclear Magnetic Resonance Characterizations of Ethylene-Based Polymers", JMS—Rev. Macromol. Chem. Phys., 1989, pp. 201-317.

Shroff et al., "Long-Chain-Branching Index for Essentially Linear Polyethylenes", American Chemical Society; Macromolecules, vol. 32, pp. 8454-8464.

Wild et al., "Determination of Branching Distributions in Polyethylene and Ethylene Copolymers", J. Polym. Sci., Part B, Polym. Phys., vol. 20 (3), pp. 441-455.

Wood-Adams et al., "Effect of Molecular Structure on the Linear Viscoelastic Behavior of Polyethylene; Macromolecules", vol. 33, 2000, pp. 7489-7499.

Yau et al., "Analytical and Polymer Science, TAPPI Polymers, Laminations, and Coatings Conference Proceedings", Westin Hotel in Chicago, 2000, vol. 2, pp. 699-707.

Yau et al., "Application of Triple-Detector Size Exclusion Chromatography (On-Line Differential Refractometer, Viscometer and Light Scattering Detectors) for the Characterization of Brominated Polystyrene", Int'l J Polymer Analysis and Characterization, vol. 2, 1996, pp. 151-171.

* cited by examiner

ETHYLENE INTERPOLYMERS CATALYZED USING MIXED HOMOGENEOUS CATALYST FORMULATIONS

CROSS-REFERENCE TO RELATED APPLICATIONS

This application is a U.S. National Phase Application under 35 U.S.C. § 371 of International Application No. PCT/IB2021/059182, filed on Oct. 6, 2021, which in turn claims priority to and the benefit of U.S. Provisional Patent Application No. 63/089,204, filed Oct. 8, 2020, both of which are incorporated herein by reference in their entirety.

TECHNICAL FIELD

The present disclosure provides ethylene interpolymer products comprising a first component and a second component with dissimilar molecular weights wherein the first component and the second component are produced using a first homogeneous catalyst formulation and a second homogeneous catalyst formulation. The ethylene interpolymer products disclosed herein have an optimized relaxation process and thermo-rheological behavior and when converted into film have good puncture resistance and performance in the heat-sealing process.

BACKGROUND ART

There is extensive knowledge on heat-sealing process and polyolefin compositions useful for such process. From a design-for-performance perspective, it is known that the ability of interfacial polymer chains to diffuse across the interface in the region to be sealed is of great importance in this process. It is further known to those of ordinary experience that polymer compositions molecular mobility (i.e., self-diffusion) improves as overall molecular weight decreases. However, decreasing overall molecular weight can be problematic where high resistance against peel stresses is desired. As a result, there is still a need to develop improved chain architectures for heat-sealing applications with optimized wettability, self-diffusion and resistance against peel stresses.

SUMMARY OF THE INVENTION

One embodiment of this disclosure is an ethylene interpolymer product comprising a first component with an undetectable level of long-chain branches quantified by a dimensionless Long Chain Branching Factor (LCBF) less than about 0.001 produced using a first homogeneous catalyst formulation and a second component with a detectable level of long-chain branches quantified by a dimensionless Long Chain Branching Factor (LCBF) greater than about 0.001 produced using a second homogeneous catalyst formulation, wherein said first component has a weight-average molecular weight higher than said second component, wherein said ethylene interpolymer product is characterized by:

(a) an Arrhenius type flow activation energy $E_a$ greater than or equal to 33 kJ/mol and less than or equal to 45 kJ/mol;

(b) a number-average relaxation time to measured at 190° C. greater than or equal to 2 ms and less than or equal to 15 ms, wherein said number-average relaxation time $\tau_n$ is calculated using zero-shear viscosity $\eta_0$ at 190° C. and plateau modulus $G_N^0$ at 190° C., according to $$\tau_n = \frac{\eta_0}{G_N^0}.$$

One embodiment of this disclosure is an ethylene interpolymer product comprising a first component with an undetectable level of long-chain branches quantified by a dimensionless Long Chain Branching Factor (LCBF) less than about 0.001 produced using a first homogeneous catalyst formulation and a second component with a detectable level of long-chain branches quantified by a dimensionless Long Chain Branching Factor (LCBF) greater than about 0.001 produced using a second homogeneous catalyst formulation, wherein said first component has a weight-average molecular weight higher than said second component, wherein said ethylene interpolymer product is characterized by:

(a) an Arrhenius type flow activation energy $E_a$ greater than or equal to 33 kJ/mol and less than or equal to 45 kJ/mol;

(b) a number-average relaxation time $\tau_n$ measured at 190° C. greater than or equal to 2 ms and less than or equal to 15 ms, wherein said number-average relaxation time $\tau_n$ is calculated using zero-shear viscosity $\eta_0$ at 190° C. and plateau modulus $G_N^0$ at 190° C., according to $$\tau_n = \frac{\eta_0}{G_N^0};$$

wherein said ethylene interpolymer product has from about 0.003 part per million (ppm) to about 2.7 ppm of titanium originating from the first homogenous catalyst formulation; and from about 0.003 ppm to about 2.7 ppm of hafnium originating from the second homogeneous catalyst formulation wherein said residual catalytic metals are measured using neutron activation analysis.

Further embodiments of the ethylene interpolymer have a number-average relaxation time $\tau_n$ greater than or equal to 5 ms and less than or equal to 12 ms.

Further embodiments of the ethylene interpolymer have an Arrhenius type flow activation energy $E_a$ greater than or equal to 36 kJ/mol and less than or equal to 42 kJ/mol.

Additional embodiments of this disclosure include an ethylene interpolymer product, wherein the ethylene interpolymer product has a highest DSC peak melting temperature during $2^{nd}$-heating cycle less than or equal to 120° C. and greater than or equal to 60° C.

Further embodiments of the ethylene interpolymer product are in a fully molten state at about $T_m$+30° C., wherein $T_m$ is a DSC endothermic peak during $2^{nd}$-heating cycle with the highest melting temperature. A fully molten state in the current disclosure is characterized as a temperature regime above said $T_m$ wherein the DSC thermogram fully returns to the heat-flow baseline during the $2^{nd}$-heating cycle.

In embodiments, the ethylene interpolymer product is in a fully molten state at about $T_m$+30° C. and has a number-average relaxation $\tau_n$ time at $T_m$+30° C. less than 80 ms and greater than 27 ms.

In embodiments of this disclosure, the ethylene interpolymer product is in a fully molten state at about $T_m$+30° C. and has a zero-shear viscosity at $T_m$+30° C. less than 60 kPa·s and greater than 30 kPa·s.

Further embodiments of this disclosure include an ethylene interpolymer product, wherein said ethylene interpolymer product has a melt index equal to or greater than 0.5 dg/min and less than 10 dg/min or equal to or greater than 0.5 dg/min and less than 6 dg/min; wherein melt index is measured according to ASTM D1238 (2.16 kg load and 190° C.).

Embodiments of this disclosure include an ethylene interpolymer product, wherein said ethylene interpolymer product has a density equal to or less than 0.918 g/cm³ and equal to or greater than 0.897 g/cm³; or equal to or less than 0.914 g/cm³ and equal to or greater than 0.900 g/cm³; wherein density is measured according to ASTM D792.

Embodiments of this disclosure include an ethylene interpolymer product, wherein said ethylene interpolymer product has a polydispersity index $$\left(\frac{M_w}{M_n}\right)$$

greater than 2.2 and less than 5.

Embodiments of the disclosed ethylene interpolymer product comprises a first component having a $$\left(\frac{M_w}{M_n}\right)$$

from about 1.7 to about 2.8 and a second component having a $$\left(\frac{M_w}{M_n}\right)$$

from about 1.7 to about 2.8.

Embodiments of the disclosed ethylene interpolymer product comprises a first component having a weight-average molecular weight $M_w^1$ from about 120000 to about 160000 g/mol and a second component having a weight-average molecular weight $M_w^2$ from about 35000 to about 65000 g/mol.

Embodiments of the disclosed ethylene interpolymer product comprises a first component having a weight-average molecular weight $M_w^1$ from about 120000 to about 160000 g/mol and a second component having a weight-average molecular weight $M_w^2$ from about 35000 to about 65000 g/mol, wherein $M_w^1$ and $M_w^2$ satisfy the inequality $2.0 \leq M_w^1/M_w^2 \leq 4.0$.

Embodiments of the disclosed ethylene interpolymer product comprise a first component and a second component, wherein said first component and said second component have a density $\rho^1$ and $\rho^2$ satisfying the inequality $0$ g/cm³$\leq|\rho^2-\rho^1|\leq0.018$ g/cm³.

Embodiments of the disclosed ethylene interpolymer product show a single elution peak in a CTREF analysis.

Embodiments include an ethylene interpolymer product containing from about 10 to about 90 wt. % of a first component and from about 10 to about 90 wt. % of a second component; where wt. % is the weight of the first and the second components, individually, divided by the total weight of the ethylene interpolymer product.

Embodiments include an ethylene interpolymer product containing from 2.5 to 10 mole percent of one or more than one α-olefin, wherein said one or more than one α-olefin is selected from the group consisting of C₃ to C₁₀ α-olefins. Embodiments include ethylene interpolymer products containing the following α-olefins: 1-octene, 1-hexene or a mixture of 1-octene and 1-hexene.

Embodiments of this disclosure include an ethylene interpolymer product comprising a first component with an undetectable level of long-chain branches quantified by a dimensionless Long Chain Branching Factor (LCBF) less than about 0.001 produced using an unbridged single site catalyst formulation.

Embodiments of this disclosure include an ethylene interpolymer product comprising a first component with an undetectable level of long-chain branches quantified by a dimensionless Long Chain Branching Factor (LCBF) less than about 0.001 produced using an unbridged single site catalyst formulation containing a component A defined by the Formula (I):

$$(L^A)_a M(PI)_b(Q)_n \tag{I}$$

wherein $L^A$ is selected from the group consisting of unsubstituted cyclopentadienyl, substituted cyclopentadienyl, unsubstituted indenyl, substituted indenyl, unsubstituted fluorenyl and substituted fluorenyl;
M is a metal selected from titanium, hafnium and zirconium; Pl is a phosphinimine ligand; Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M.

Embodiments of this disclosure include an ethylene interpolymer product comprising a second component with a detectable level of long-chain branches quantified by a dimensionless Long Chain Branching Factor (LCBF) greater than about 0.001 produced using a bridged metallocene catalyst formulation.

Embodiments of this disclosure include an ethylene interpolymer product comprising a second component with a detectable level of long-chain branches quantified by a dimensionless Long Chain Branching Factor (LCBF) greater than about 0.001 produced using a bridged metallocene catalyst formulation containing a component B defined by Formula (II):

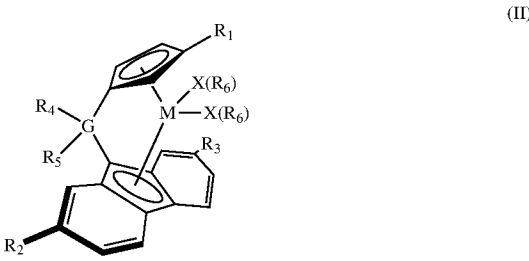

wherein M is a metal selected from titanium, hafnium and zirconium; G is the element carbon, silicon, germanium, tin or lead; X represents a halogen atom, $R_6$ groups are independently selected from a hydrogen atom, a $C_{1-20}$ hydrocarbyl radical, a $C_{1-20}$ alkoxy radical or a $C_{6-10}$ aryl oxide radical, these radicals may be linear, branched or cyclic or further substituted with halogen atoms, $C_{1-10}$ alkyl radicals, 5      6

$C_{1\text{-}10}$ alkoxy radicals, $C_{6\text{-}10}$ aryl or aryloxy radicals; $R_1$ represents a hydrogen atom, a $C_{1\text{-}20}$ hydrocarbyl radical, a $C_{1\text{-}20}$ alkoxy radical or a $C_{6\text{-}10}$ aryl oxide radical; $R_2$ and $R_3$ are independently selected from a hydrogen atom, a $C_{1\text{-}20}$ hydrocarbyl radical, a $C_{1\text{-}20}$ alkoxy radical or a $C_{6\text{-}10}$ aryl oxide radical, and; $R_4$ and $R_5$ are independently selected from a hydrogen atom, a $C_{1\text{-}20}$ hydrocarbyl radial, a $C_{1\text{-}20}$ alkoxy radical or a $C_{6\text{-}10}$ aryl oxide radical.

Embodiments of this disclosure include an ethylene interpolymer product comprising a first component with an undetectable level of long-chain branches quantified by a dimensionless Long Chain Branching Factor (LCBF) less than about 0.001 produced using a first homogeneous catalyst formulation and a second component with a detectable level of long-chain branches quantified by a dimensionless Long Chain Branching Factor (LCBF) greater than to about 0.001 produced using a second homogeneous catalyst formulation, wherein said first component has a weight-average molecular weight higher than said second component, wherein said ethylene interpolymer product contains a catalytic metal A that may range from about 0.003 ppm to about 2.7 ppm, where catalytic metal A originates from the first homogeneous catalyst formulation. The ethylene interpolymer product may also contain a catalytic metal B that may range from about 0.003 ppm to about 2.7 ppm, where catalytic metal B originates from the second homogeneous catalyst formulation. In embodiments of the disclosure, metals A and B can be titanium, zirconium, or hafnium.

Further embodiments of the ethylene interpolymer product comprise a first component having a $CDBI_{50}$ from about 70 to about 98% and a second component having a $CDBI_{50}$ from about 70 to about 98%.

Further embodiments of the ethylene interpolymer product have a detectable level of long-chain branches quantified by a dimensionless Long Chain Branching Factor (LCBF) greater than or equal to about 0.001 and less than or equal 0.005.

Further embodiments of the ethylene interpolymer product comprise a first component with an undetectable level of long-chain branches quantified by a dimensionless Long Chain Branching Factor (LCBF) less than about 0.001 produced using a first homogeneous catalyst formulation and a second component with a detectable level of long-chain branches quantified by a dimensionless Long Chain Branching Factor (LCBF) greater than about 0.001 and less than or equal to 0.05 produced using a second homogenous catalyst formulation, wherein said first component has a weight-average molecular weight higher than said second component.

Further embodiments of this disclosure include an ethylene interpolymer product, wherein said ethylene interpolymer product is manufactured in a solution phase polymerization process.

Further embodiments of this disclosure include an ethylene interpolymer product comprising a first component made in a first solution phase polymerization reactor and a second component made in a second solution phase polymerization reactor, wherein the first and second solution polymerization reactors are configured in parallel to one another.

Further embodiments include polyethylene films having a thickness of from 0.5 to 10 mil, comprising at least one layer, where the layer comprises an ethylene interpolymer product comprising a first component with an undetectable level of long-chain branches quantified by a dimensionless Long Chain Branching Factor (LCBF) less than about 0.001 produced using a first homogeneous catalyst formulation and a second component with a detectable level of long-chain branches quantified by a dimensionless Long Chain Branching Factor (LCBF) greater than about 0.001 produced using a second homogeneous catalyst formulation, wherein said first component has a weight-average molecular weight higher than said second component, wherein said ethylene interpolymer product is characterized by:

(a) an Arrhenius type flow activation energy $E_a$ greater than or equal to 33 kJ/mol and less than or equal to 45 kJ/mol; and (b) a number-average relaxation time $\tau_n$ measured at 190° C. greater than or equal to 2 ms and less than or equal to 15 ms, wherein said number-average relaxation time $\tau_n$ is calculated using zero-shear viscosity $\eta_0$ at 190° C. in kPa·s and plateau modulus $G_N^0$ at 190° C. in MPa, according to $$\tau_n = \frac{\eta_0}{G_N^0};$$

wherein said ethylene interpolymer product has from about 0.003 part per million (ppm) to about 2.7 ppm of titanium originating from the first homogenous catalyst formulation; and from about 0.003 ppm to about 2.7 ppm of hafnium originating from the second homogeneous catalyst formulation wherein said residual catalytic metals are measured using neutron activation analysis.

Embodiments also include multilayer films comprising from 2 to 11 layers.

Polyethylene films disclosed herein had improved resistance against peel stresses during the heat-sealing process. Embodiments of this disclosure include a polyethylene film comprising at least one layer comprising an ethylene interpolymer product, wherein said polyethylene film is characterized by a hot-tack peak force that from about 12 N to about 20 N, or from about 12.5 N to about 19 N, or from about 13 N to about 17.5 N; wherein hot-tack force is measured on a film specimen with a width of 1 inch (25.4 mm) over a temperature range of 80° C. to 170° C.

Polyethylene films disclosed herein also had improved puncture resistance. Embodiments of this disclosure include a polyethylene film comprising at least one layer comprising an ethylene interpolymer product, wherein said polyethylene film is characterized by a lubricated puncture resistance of from about 100 J/mm to about 150 J/mm, or from about 106 J/mm to about 145 J/mm, or from about 114 J/mm to about 140 J/mm.

Definition of Terms

Other than in the examples or where otherwise indicated, all numbers or expressions referring to quantities of ingredients, extrusion conditions, etc., used in the specification and claims are to be understood as modified in all instances by the term "about". Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; an equivalent term is "linear α-olefin".

As used herein, the term "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymer produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using homogeneous catalyst formulations. Typically, homogeneous ethylene interpolymers have narrow molecular weight distributions, for example Size Exclusion Chromatography (SEC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically, the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers. A blend of two or more homogeneous ethylene interpolymers, that differ in comonomer content, may have a $CDBI_{50}$ less than 70%; in this disclosure such a blend was defined as a homogeneous blend or homogeneous composition. Similarly, a blend of two or more homogeneous ethylene interpolymers, that differ in weight average molecular weight ($M_w$), may have a $M_w/M_n \geq 2.8$; in this disclosure such a blend was defined as a homogeneous blend or homogeneous composition.

In this disclosure, the term "homogeneous ethylene interpolymer" refers to both linear homogeneous ethylene interpolymers and substantially linear homogeneous ethylene interpolymers. In the art, linear homogeneous ethylene interpolymers are generally assumed to have no long chain branches or an undetectable amount of long chain branches; while substantially linear ethylene interpolymers are generally assumed to have greater than about 0.01 to about 3.0 long chain branches per 1000 carbon atoms. A long chain branch is macromolecular in nature, i.e. similar in length to the macromolecule that the long chain branch is attached to.

In this disclosure the term homogeneous catalyst is used. The term catalyst refers to the chemical compound containing the catalytic metal, which is a metal-ligand complex. In this disclosure, the term 'homogeneous catalyst' is defined by the characteristics of the polymer produced by the homogeneous catalyst. Specifically, a catalyst is a homogeneous catalyst if it produces a homogeneous ethylene interpolymer that has a narrow molecular weight distribution (SEC $M_w/M_n$ values of less than 2.8) and a narrow comonomer distribution ($CDBI_{50}>70\%$). Homogeneous catalysts are well known in the art. Two subsets of the homogeneous catalyst genus include unbridged metallocene catalysts and bridged metallocene catalysts. Unbridged metallocene catalysts are characterized by two bulky ligands bonded to the catalytic metal, a non-limiting example includes bis(isopropyl-cyclopentadienyl) hafnium dichloride. In bridged metallocene catalysts the two bulky ligands are covalently bonded (bridged) together, a non-limiting example includes diphenylmethylene (cyclopentadienyl) (2,7-di-t-butylfuorenyl) hafnium dichloride; wherein the diphenylmethylene group bonds, or bridges, the cyclopentadienyl and fluorenyl bulky ligands together. Two additional subsets of the homogeneous catalyst genus include unbridged and bridged single site catalysts. In this disclosure, single site catalysts are characterized as having only one bulky ligand bonded to the catalytic metal. A non-limiting example of an unbridged single site catalyst includes cyclopentadienyl tri(tertiary butyl)phosphinimine titanium dichloride. A non-limiting example of a bridged single site catalyst includes [$C_5(CH_3)_4$—$Si(CH_3)_2$—$N(tBu)$] titanium dichloride, where the —$Si(CH_3)_2$- group functions as the bridging group.

Herein, the term "polyolefin" includes ethylene polymers and propylene polymers; non-limiting examples of propylene polymers include isotactic, syndiotactic and atactic propylene homopolymers, random propylene copolymers containing at least one comonomer (e.g. α-olefins) and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear, branched, or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" and its superscript form "R1" refers to a first reactor in a continuous solution polymerization process; it being understood that R1 is distinctly different from the symbol $R^1$; the latter is used in chemical formula, e.g. representing a hydrocarbyl group. Similarly, the term "R2" and its superscript form "R2" refers to a second reactor.

As used herein, the term "oligomers" refers to an ethylene polymer of low molecular weight, e.g., an ethylene polymer with a weight average molecular weight (Mw) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

DESCRIPTION OF EMBODIMENTS

In an embodiment of the disclosure, an ethylene interpolymer product comprises a first component and a second component wherein the first component has a weight-average molecular weight higher than the second component.

The first component, the second component and the ethylene interpolymer product are each further described below.

The First Component

In an embodiment, the first component has an undetectable level of long-chain branches quantified by a dimensionless Long Chain Branching Factor (LCBF) less than about 0.001.

In an embodiment of the disclosure, the first component is an ethylene interpolymer synthesized using a first homogeneous catalyst formulation.

In an embodiment, the first homogeneous catalyst formulation is an unbridged single site catalyst formulation.

In an embodiment, the unbridged single site catalyst formulation contains a component A defined by the Formula (I)

$$(L^A)_a M(PI)_b(Q)_n \qquad (I)$$

wherein $L^A$ is selected from the group consisting of unsubstituted cyclopentadienyl, substituted cyclopentadienyl, unsubstituted indenyl, substituted indenyl, unsubstituted fluorenyl and substituted fluorenyl;

M is a metal selected from titanium, hafnium and zirconium; Pl is a phosphinimine ligand; Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M.

The density of the first component may have an upper limit of about 0.905 g/cm$^3$; in some cases, about 0.9048 g/cm$^3$ and, in other cases about 0.9044 g/cm$^3$. The lower limit on the density of the first component may be about 0.903 g/cm$^3$, in some cases about 0.9033 g/cm$^3$, and, in other cases about 0.9037 g/cm$^3$.

The upper limit on the CDBI$_{50}$ of the first component may be about 98%, in other cases about 95% and in still other cases about 90%. The lower limit on the CDBI$_{50}$ of the first component may be about 70%, in other cases about 75% and in still other cases about 80%.

The upper limit on the $M_w/M_n$ (the SEC determined weight-average molecular weight $M_w$ divided by the number-average molecular weight $M_n$) of the first component may be about 2.8, in other cases about 2.5 and in still other cases about 2.2. The lower limit on the $M_w/M_n$ of the first component may be about 1.7, in other cases about 1.8 and in still other cases about 1.9.

In an embodiment, the first component contains catalyst residues that reflect the chemical composition of the first homogeneous catalyst formulation. More specifically, the first component contains "a metal A" that originates from the unbridged single site catalyst of Formula (I). Non-limiting examples of metal A include Group 4 metals, titanium, zirconium and hafnium. The upper limit on the ppm of metal A in the first component may be about 3.0 ppm, in other cases about 2.0 ppm and in still other cases about 1.5 ppm. The lower limit on the ppm of metal A in the first component may be about 0.03 ppm, in other cases about 0.09 ppm and in still other cases about 0.15 ppm.

The upper limit on the weight-average molecular weight of the first component $M_w^{HMW}$ may be about 160000 g/mol, in other cases about 150000 g/mol and in still other cases about 145000 g/mol. The lower limit on the weight-average molecular weight of the first component $M_w^{HMW}$ may be about 120000 g/mol, in other cases about 130000 g/mol and in still other cases about 135000 g/mol.

The upper limit on the weight percent (wt. %) of the first component in the ethylene interpolymer product may be about 90 wt. %, in other cases about 80 wt. %, in other cases about 70 wt. %, in other cases about 60 wt. % and in still other cases about 55 wt. %. The lower limit on the wt. % of the first component in the ethylene interpolymer product may be about 10 wt. %, in other cases about 20 wt. %, in other cases about 30 wt. %, in other cases about 40 wt. % and in still other cases about 45 wt. %.

The Second Component

In an embodiment, the second component has a detectable level of long-chain branches quantified by a dimensionless Long Chain Branching Factor (LCBF) greater than about 0.001.

In an embodiment, the second component has a molecular weight lower than that of the first component.

In an embodiment of the disclosure, the second component is an ethylene interpolymer synthesized using a second homogeneous catalyst formulation.

In an embodiment, the second homogeneous catalyst formulation is a bridged metallocene catalyst formulation.

In an embodiment, the bridged metallocene catalyst formulation contains component B defined by Formula (II):

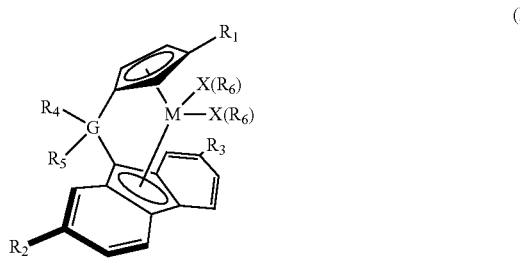

$$(II)$$

wherein M is a metal selected from titanium, hafnium and zirconium; G is the element carbon, silicon, germanium, tin or lead; X represents a halogen atom, $R_6$ groups are independently selected from a hydrogen atom, a $C_{1-20}$ hydrocarbyl radical, a $C_{1-20}$ alkoxy radical or a $C_{6-10}$ aryl oxide radical, these radicals may be linear, branched or cyclic or further substituted with halogen atoms, $C_{1-10}$ alkyl radicals, $C_{1-10}$ alkoxy radicals, $C_{6-10}$ aryl or aryloxy radicals; $R_1$ represents a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical, and; $R_4$ and $R_5$ are independently selected from a hydrogen atom, a $C_{1-20}$ hydrocarbyl radial, a $C_{1-20}$ alkoxy radical or a $C_{6-10}$ aryl oxide radical.

The upper limit density of the second component may be about 0.923 g/cm$^3$; in some cases, about 0.919 g/cm$^3$ and, in other cases about 0.914 g/cm$^3$. The lower limit on density of the second component may be about 0.894 g/cm$^3$, in some cases about 0.900 g/cm$^3$, and, in other cases about 0.903 g/cm$^3$.

The upper limit on the CDBI$_{50}$ of the second component may be about 98%, in other cases about 95% and in still other cases about 90%. The lower limit on the CDBI5O of the second component may be about 70%, in other cases about 75% and in still other cases about 80%.

The upper limit on the $M_w/M_n$ of the second component may be about 2.8, in other cases about 2.5 and in still other cases about 2.2. The lower limit on the $M_w/M_n$ the second component may be about 1.7, in other cases about 1.8 and in still other cases about 1.9.

In an embodiment, the second component contained catalyst residues that reflect the chemical composition of the second homogeneous catalyst formulation. Those skilled in the art will understand that catalyst residues are typically quantified by the parts per million of metal in the second component, where metal originates from the metal in catalyst component B Formula (II); hereinafter this metal will be referred to "metal B". Non-limiting examples of metal B include Group 4 metals, titanium, zirconium and hafnium. The upper limit on the ppm of metal B in the second component may be about 3.0 ppm, in other cases about 2.0 ppm and in still other cases about 1.5 ppm. The lower limit on the ppm of metal B in the second component may be about 0.03 ppm, in other cases about 0.09 ppm and in still other cases about 0.15 ppm.

The upper limit on the weight-average molecular weight of the second component $M_w^2$ may be about 65000 g/mol, in other cases about 60000 g/mol and in still other cases about 55000 g/mol. The lower limit on the weight-average molecular weight of the second component $M_w^2$ may be about 35000 g/mol, in other cases about 40000 g/mol and in still other cases about 45000 g/mol.

In embodiments of the disclosure, the weight average molecular weight of second component $M_w^2$ and the weight average molecular weight of the first component $M_w^1$ satisfy inequality $2.0 \leq M_w^1/M_w^2 \leq 4.0$; in some cases satisfy inequality $2.3 \leq M_w^1/M_w^2 \leq 3.5$; or in other cases satisfy inequality $2.5 \leq M_w^1/M_w^2 \leq 3.3$.

In embodiments of the disclosure, the density of the second component $\rho^2$ and the density of the first component $\rho^1$ satisfy inequality $0.000 \text{ g/cm}^3 \leq |\rho^1 - \rho^2| \leq 0.018 \text{ g/cm}^3$; in some cases satisfy inequality $0.000 \text{ g/cm}^3 \leq |\rho^1 - \rho^2| \leq 0.014 \text{ g/cm}^3$; or in other cases satisfy inequality $0.000 \text{ g/cm}^3 \leq |\rho^1 - \rho^2| \leq 0.010 \text{ g/cm}^3$.

The upper limit on the weight percent (wt. %) of second component in the ethylene interpolymer product may be about 90 wt. %, in other cases 80 wt. %, in other cases about 70 wt. %, in other cases about 60 wt. % and in still other cases about 55 wt. %. The lower limit on the wt. % of the second component in the ethylene interpolymer product may be about 10 wt. %, in other cases about 20 wt. %, in other cases about 30 wt. %; in other cases about 40 wt. % and in still other cases about 45 wt. %.

Ethylene Interpolymer Product

The ethylene interpolymer product disclosed herein can be made using any well-known techniques in the art, including but not limited to melt blending, solution blending, or in-reactor blending to bring together a first component and a second component.

In an embodiment, the ethylene interpolymer product of the present disclosure is made by forming a first component in a first reactor by polymerizing ethylene and an alpha olefin with a first homogenous catalyst formulation; and forming a second component in a second reactor by polymerizing ethylene and an alpha olefin with a second homogenous catalyst formulation.

In an embodiment, the ethylene interpolymer product of the present disclosure is made by forming a first component in a first reactor by polymerizing ethylene and an alpha olefin with a first homogenous catalyst formulation; and forming a second component in a second reactor by polymerizing ethylene and an alpha olefin with a second homogenous catalyst formulation, where the first and second polymerization reactors are configured in parallel to one another.

In an embodiment, the ethylene interpolymer product of the present disclosure is made by forming a first component in a first solution phase polymerization reactor by polymerizing ethylene and an alpha olefin with a first homogenous catalyst formulation; and forming a second component in a second solution phase polymerization reactor by polymerizing ethylene and an alpha olefin with a second homogenous catalyst formulation, where the first and second polymerization reactors are configured in parallel to one another.

In an embodiment, the solution phase polymerization reactor used as a first solution phase reactor and a second solution phase reactor is a continuously stirred tank reactor.

In a solution phase polymerization reactor, a variety of solvents may be used as the process solvent; non-limiting examples include linear, branched or cyclic $C_5$ to $C_{12}$ alkanes. Non-limiting examples of $\alpha$-olefins include 1-propene, 1-butene, 1-pentene, 1-hexene and 1-octene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, cyclopentane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

The density of the ethylene interpolymer product ($\rho^f$) may be equal to or less than 0.918 g/cm³; in some cases equal to or less than 0.914 g/cm³ and; in other cases equal to or less than 0.910 g/cm³. The density of the ethylene interpolymer product may be equal to or greater than 0.897 g/cm³, in some cases equal to or greater than 0.900 g/cm³, and, in other cases equal to or greater than 0.903 g/cm³.

The ethylene interpolymer product contains from 2.5 to 10 mole percent of one or more than one $\alpha$-olefin; in some cases from 2.5 to 6 mole percent; in other cases from 3 to 5 mole percent. Said one or more $\alpha$-olefin is selected from the group consisting of $C_3$ to $C_{10}$ $\alpha$-olefins. Embodiments include ethylene interpolymer products containing the following $\alpha$-olefins: 1-octene, 1-hexene or a mixture of 1-octene and 1-hexene.

The upper limit on the $CDBI_{50}$ of the ethylene interpolymer product may be about 97%, in other cases about 90% and in still other cases about 85%. The lower limit on the $CDBI_{50}$ of an ethylene interpolymer product may be about 50%, in other cases about 60% and in still other cases about 65%.

In embodiments of this disclosure the ethylene interpolymer product will show a single elution peak in a CTREF analysis. The term "single elution peak" is herein defined to mean there will be only one maximum evident in the observed CTREF profile. The single elution peak in the CTREF analysis can be symmetric or asymmetric (right- or left-skewed). The single elution peak can further comprise a shoulder or shoulders.

The $M_w/M_n$ of the ethylene interpolymer product may be less than 5, in other cases less than 4 and in still other cases less than 3. The $M_w/M_n$ of the ethylene interpolymer product may be greater than 2.2, in other cases greater than 2.3 and in still other greater than 2.4.

The upper limit on the ppm of metal A in the ethylene interpolymer product was determined by maximizing the weight fraction (i.e., 0.90) of the first component and minimizing the weight fraction (i.e., 0.10) of the second component. Specifically, the upper limit on the ppm of metal A in the ethylene interpolymer product was 2.7 ppm: i.e., 0.9×3 ppm; where 3 ppm is the upper limit on the ppm of metal A in the first component. In other cases, the upper limit on the ppm of metal A in the ethylene interpolymer product was 2.4 ppm, in other cases 2.1 ppm and in still other cases 1.8 ppm. The lower limit on the ppm of metal A in the ethylene interpolymer product was determined by minimizing the weight fraction (i.e. 0.10) of the first component and maximizing the weight fraction (i.e. 0.90) of the second component. Specifically, the lower limit on the ppm of metal A in the ethylene interpolymer product was 0.003 ppm: i.e. (0.1×0.03 ppm), where 0.03 ppm was the lower limit of metal A in the first component. In other cases, the lower limit on the ppm of metal A in the ethylene interpolymer product was 0.006 ppm, in other cases 0.009 ppm and in still other cases 0.012 ppm.

The upper limit on the ppm of metal B in the ethylene interpolymer product was determined by maximizing the weight fraction (i.e., 0.90) of the second component, i.e. 2.7 ppm (0.90×3 ppm), where 3 ppm was the upper limit on the ppm of metal B in the second component. In other cases, the upper limit on the amount of metal B in the ethylene interpolymer product was 2.4 ppm, in other cases 2.1 ppm and in still other cases 1.8 ppm. The lower limit on the ppm of metal B in the ethylene interpolymer product was determined by minimizing the weight fraction (i.e., 0.10) of the second component, i.e. 0.003 ppm (0.10×0.03 ppm), where 0.03 ppm was the lower limit on the ppm of metal B in the second component. In other cases, the lower limit on the ppm of metal B in the ethylene interpolymer product was 0.006 ppm, in other cases 0.009 ppm and in still other cases 0.012 ppm.

The upper limit on the highest DSC peak melting temperature during $2^{nd}$-heating cycle of the ethylene interpolymer may be about 120° C., in other cases about 115° C. and in still other cases about 110° C. The lower limit on the highest DSC peak melting temperature during $2^{nd}$-heating cycle of the ethylene interpolymer may be about 60° C., in other cases about 80° C. and in still other cases about 90° C.

In embodiments, the ethylene interpolymer product is in a fully molten state at about $T_m$+30° C., in other cases at about $T_m$+20° C. and still in other cases at about $T_m$+10° C., wherein $T_m$ is a DSC endothermic peak during $2^{nd}$-heating cycle with the highest melting temperature. A fully molten state in the current disclosure is characterized as a temperature regime above said $T_m$ wherein the DSC thermogram fully returns to the heat-flow baseline during the $2^{nd}$-heating cycle.

The melt index (measured according to ASTM D1238 at a 2.16 kg load and 190° C.) of the ethylene interpolymer product may be less 10 dg/min, in some cases less than 8 dg/min; in other cases less than 6 dg/min, and; in still other cases less than 3 dg/min. The melt index (measured according to ASTM D1238 at a 2.16 kg load and 190° C.) of the ethylene interpolymer product may be equal to or greater than 0.5 dg/min, in some cases equal to or greater than 0.55 dg/min; in other cases equal to or greater than 0.6 dg/min, and; in still other cases equal to or greater than 0.65 dg/min.

In embodiments, the upper limit on the melt flow ratio $I_{21}/I_2$ of the ethylene interpolymer product is less than 40 and in some cases is less than about 30. In embodiments of the disclosure the melt flow ratio $I_{21}/I_2$ of the ethylene interpolymer product may be from greater than 10 to 40, or from greater than 10 to 30, or from 10 to about 28.

The upper limit on the weight-average molecular weight of the ethylene interpolymer product may be about 120000 g/mol, in other cases about 115000 g/mol and in still other cases about 110000 g/mol. The lower limit on the weight-average molecular weight of the ethylene interpolymer product may be about 65000 g/mol, in other cases about 70000 g/mol and in still other cases about 75000 g/mol.

In embodiments of the present disclosure, the ethylene interpolymer product may optionally include, depending on its intended use, additives and adjuvants. Non-limiting examples of additives and adjuvants include, antioxidants, slip agents, processing aids, anti-static additives, colorants, dyes, filler materials, heat stabilizers, light stabilizers, light absorbers, lubricants, pigments, plasticizers, nucleating agents and combinations thereof.

In embodiments of the present disclosure, the ethylene interpolymer product may be converted into flexible manufactured articles such as monolayer or multilayer films. In embodiments, processes to prepare such films include blown film processes or cast film processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the drawdown rate. After exiting the nip rollers, the bubble or tube is collapsed and may be slit in the machine direction thus creating sheeting. Each sheet may be wound into a roll of film. Each roll may be further slit to create film of the desired width.

The cast film process is similar to the film blowing process in that a single or multiple extruder(s) may be used; however, the various thermoplastic materials are metered into a flat die and extruded into a monolayer or multilayer sheet, rather than a tube. In the cast film process the extruded sheet is solidified on a chill roll.

Depending on the end-use application, the disclosed ethylene interpolymer products may be converted into films that span a wide range of thicknesses. Embodiments include films where thicknesses may range from 0.5 mil (13 µm) to 10 mil (254 µm). In an embodiment, the end-use application includes packaging films containing the disclosed ethylene interpolymer product.

In embodiments, the monolayer, in monolayer films, may contain more than one ethylene interpolymer product and/or one or more additional polymer. In embodiments, the additional polymer includes ethylene polymers and propylene polymers. The lower limit on the weight percent of the ethylene interpolymer product in a monolayer film may be 3 wt. %, in other cases 10 wt. % and in still other cases 30 wt. %. The upper limit on the weight percent of the ethylene interpolymer product in the monolayer film may be 100 wt. %, in other cases 90 wt. % and in still other cases 70 wt. %.

The ethylene interpolymer products disclosed herein may also be used in one or more layers of a multilayer film. In embodiments, the multilayer film includes three, five, seven, nine or eleven.

In embodiments, the lower limit of the thickness of a specific layer containing the ethylene interpolymer product within a multilayer film may be 5%, in other cases 15% and in still other cases 30% of the total multilayer film thickness. In embodiments, the upper limit of the thickness of a specific layer containing the ethylene interpolymer product within a multilayer film may be 95%, in other cases 80% and in still other cases 65% of the total multilayer film thickness. Each individual layer of a multilayer film may contain more than one ethylene interpolymer product and/or additional thermoplastics.

In embodiments of the present disclosure, the ethylene interpolymer product, when formed into a film, has a lubricated puncture resistance with a lower limit of about 100 J/mm, in other cases of about 106 J/mm and in still other cases about 114 J/mm. In embodiments of the present disclosure, the ethylene interpolymer product, when formed into a film, has a lubricated puncture resistance with an upper limit of about 150 J/mm, in other cases of about 145 J/mm and in still other cases about 140 J/mm.

In embodiments of the present disclosure, the ethylene interpolymer product, when formed into a film, has a hot-tack peak strength with a lower limit of about 12 N, in other cases of about 12.5 N and in still other cases about 13 N. In embodiments of the present disclosure, the ethylene interpolymer product, when formed into a film, has a hot-tack peak strength with an upper limit of about 20 N, in other cases of about 19 N and in still other cases about 17.5 N.

Long Chain Branching in Ethylene Interpolymer Products and the Second Component In an embodiment, the ethylene interpolymer products contain at least two ethylene-based polymeric components with dissimilar molecular weights, a first component and a second component, wherein the first component has a weight-average molecular weight higher than the second component. The first component and the second component are produced using a first and second homogeneous catalyst formulations, wherein the second homogeneous catalyst formulation producing the second component generates long-chain branched structures.

Long chain branching, hereinafter 'LCB', is a well-known structural phenomenon in polyethylenes and well known to those of ordinary skill in the art.

Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res.

1977, 10, 332-339. In this disclosure, a long chain branch is macromolecular in nature, i.e. long enough to be seen in an NMR spectra, triple detector SEC experiments or rheological experiments.

A limitation with LCB analysis via NMR is that it cannot distinguish branch length for branches equal to or longer than six carbon atoms (thus, NMR cannot be used to characterize LCB in ethylene/1-octene copolymers, which have hexyl groups as side branches).

The triple detection SEC method measures the intrinsic viscosity ($[\eta]$) (see W. W. Yau, D. Gillespie, Analytical and Polymer Science, TAPPI Polymers, Laminations, and Coatings Conference Proceedings, Chicago 2000; 2: 699 or F. Beer, G. Capaccio, L. J. Rose, J. Appl. Polym. Sci. 1999, 73: 2807 or P. M. Wood-Adams, J. M. Dealy, A. W. deGroot, O. D. Redwine, Macromolecules 2000; 33: 7489). By referencing the intrinsic viscosity of a branched polymer ($[\eta]_b$) to that of a linear one ($[\eta]_l$) at the same molecular weight, the viscosity branching index factor g' ($g'=[\eta]_b/[\eta]_l$) was used for branching characterization. However, both short chain branching (SCB) and long chain branching (LCB) make contribution to the intrinsic viscosity ($[\eta]$), effort was made to isolate the SCB contribution for ethylene/1-butene and ethylene/1-hexene copolymers but not ethylene/1-octene copolymers.

In this disclosure, a systematical investigation was performed to look at the SCB impact on the Mark-Houwink constant K for three types ethylene/1-olefin copolymers, i.e. octene, hexene and butene copolymers. After the deduction of SCB contribution, a Viscosity LCB Index was introduced for the characterization of ethylene/1-olefin copolymers containing LCB. The Viscosity LCB Index was defined as the measured Mark-Houwink constant ($K_m$) in 1,2,4-trichlorobenzene (TCB) at 140° C. for the sample divided by the SCB corrected Mark-Houwink constant ($K_{co}$) for linear ethylene/1-olefin copolymer, Eq. (1).

$$\text{Viscosity } LCB \text{ Index } = \frac{K_m}{K_{co}} = \frac{\dfrac{[\eta]}{M_v^{0.725}}}{\dfrac{391.98 - A \times SCB}{1000000}} \qquad \text{Eq. (1)}$$

Where $[\eta]$ was the intrinsic viscosity (dL/g) determined by 3D-SEC, $M_v$ was the viscosity average molar mass (g/mole) determined using 3D-SEC; SCB was the short chain branching content (SCB per 1000 $CH_2$s) determined using FTIR; and A was a constant which depends on the α-olefin present in the ethylene interpolymer product under test, specifically, A is 2.1626, 1.9772 and 1.1398 for 1-octene, 1-hexene and 1-butene respectively. In the case of an ethylene homopolymer no correction is required for the Mark-Houwink constant, i.e. SCB is zero.

In the art, rheology has also been an effective method to measure the amount of LCB, or lack of, in ethylene interpolymers. Several rheological methods to quantify LCB have been disclosed. One commonly used method was based on zero-shear viscosity ($\eta_0$) and weight average molar mass ($M_w$) data. The 3.41 power dependence ($\eta_0=KM_w^{3.41}$) has been established for monodisperse polyethylene solely composed of linear chains, for example see R. L. Arnett and C. P. Thomas, J. Phys. Chem. 1980, 84, 649-652. An ethylene polymer with a $\eta_0$ exceeding what was expected for a linear ethylene polymer, with the same $M_w$, was considered to contain long-chain branches. However, there is a debate in the field regarding the influence of polydispersity, e.g.

$M_w/M_n$. A dependence on polydispersity was observed in some cases (see M. Ansari et al., Rheol. Acta, 2011, 5017-27) but not in others (see T. P. Karjala et al., Journal of Applied Polymer Science 2011, 636-646).

Another example of LCB analysis via rheology was based on zero-shear viscosity ($\eta_0$) and intrinsic viscosity ([$\eta$]) data, for example see R. N. Shroff and H. Mavridis, Macromolecules 1999, 32, 8454; which is applicable for essentially linear polyethylenes (i.e. polyethylenes with very low levels of LCB). A critical limitation of this method is the contribution of the SCB to the intrinsic viscosity. It is well known that [$\eta$] decreases with increasing SCB content.

In this disclosure the Long Chain Branching Factor, hereinafter LCBF, was used to characterize the amount of LCB in the ethylene interpolymer products. In this disclosure, as described above, a systematical investigation was performed to look at the impact of both SCB and molar mass distribution. After the deduction of the contribution of both SCB and molar mass distribution (polydispersity), a Long Chain Branching Factor (LCBF) was introduced to characterize the amount of LCB as described below.

LCBF calculation requires the polydispersity corrected zero-shear viscosity ($ZSV_c$) and the SCB corrected intrinsic viscosity ($IV_c$) as fully described in the following paragraphs.

The correction to the zero-shear viscosity, $ZSV_c$, having dimensions of Poise, was performed as shown in equation Eq. (2):

$$ZSV_c = \frac{1.8389 \times \eta_0}{2.4110^{Ln(Pd)}} \qquad \text{Eq. (2)}$$

where $\eta_0$, the zero-shear viscosity (in Poise), of the ethylene interpolymer product was determined by DMA frequency sweep experiments at 190° C. using the Ellis model as described in the 'Testing Methods' section of this disclosure; Pd was the dimensionless polydispersity ($M_w/M_n$) as measured using conventional SEC (see 'Testing Methods') and 1.8389 and 2.4110 are dimensionless constants.

The correction to the intrinsic viscosity, $IV_c$, having dimensions of dL/g, was performed as shown in equation Eq. (3):

$$IV_c = [\eta] + \frac{A \times SCB \times M_v^{0.725}}{1000000} \qquad \text{Eq. (3)}$$

where the intrinsic viscosity [$\eta$] (dL/g) of the ethylene interpolymer product was measured using 3D-SEC (see 'Testing Methods'); SCB having dimensions of (SCB per $10^3$ CH$_2$s) was determined using FTIR (see 'Testing Methods'); $M_v$, the viscosity average molar mass (g/mol), was determined using 3D-SEC (see 'Testing Methods'); and A was a dimensionless constant that depends on the $\alpha$-olefin in the ethylene interpolymer sample, i.e. A was 2.1626, 1.9772 or 1.1398 for 1-octene, 1-hexene and 1-butene $\alpha$-olefins, respectively. In the case of an ethylene homopolymer no correction is required for the Mark-Houwink constant, i.e. SCB is zero.

Linear ethylene interpolymers (which do not contain LCB or contain undetectable levels of LCB) fall on a Reference Line defined by Eq. (4).

$$Log(IV_c)=0.2100 \times Log(ZSV_c)-0.7879 \qquad \text{Eq. (4)}$$

The calculation of the LCBF was based on the Horizontal-Shift ($S_h$) and Vertical-Shift ($S_v$) from the linear reference line defined by Eq. (4), as defined by the following equations:

$$S_h=Log(ZSV_c)-4.7619 \times Log(IV_c)-3.7519 \qquad \text{Eq. (5)}$$

$$S_v=0.2100 \times Log(ZSV_c)-Log(IV_c)-0.7879 \qquad \text{Eq. (6).}$$

In Eq. (5) and (6), it is required that $ZSV_c$ and $IV_c$ have dimensions of Poise and dL/g, respectively. The Horizontal-Shift ($S_h$) was a shift in $ZSV_c$ at constant intrinsic viscosity ($IV_c$), if one removes the Log function its physical meaning is apparent, i.e. a ratio of two zero-shear viscosities, the $ZSV_c$ of the sample under test relative to the $ZSV_c$ of a linear ethylene polymer having the same $IV_c$. The Horizontal-Shift ($S_h$) was dimensionless. The Vertical-Shift ($S_v$) was a shift in $IV_c$ at constant zero-shear viscosity ($ZSV_c$), if one removes the Log function its physical meaning is apparent, i.e., a ratio of two Intrinsic Viscosities, the $IV_c$ of a linear ethylene polymer having the same $ZSV_c$ relative to the $IV_c$ of the sample under test. The Vertical-Shift ($S_v$) was dimensionless.

The dimensionless Long Chain Branching Factor (LCBF) was defined by Eq. (7):

$$LCBF = \frac{S_h \times S_v}{2} \qquad \text{Eq. (7)}$$

In this disclosure, resins having no LCB (or undetectable LCB) were characterized by a LCBF of less than 0.001 (dimensionless).

The experimental steps described above were used to determine the LCBF of ethylene interpolymer products in the present disclosure. In an embodiment, the ethylene interpolymer product contains a detectable level of long chain branches characterized by an LCBF greater than or equal to 0.001. The LCBF of the ethylene interpolymer products may be less than or equal to about 0.005, in other cases less than or equal to about 0.004 and in still other cases less than or equal to about 0.003 (dimensionless).

In an embodiment, the first component produced using a first homogenous catalyst formulation contains no LCB or an undetectable level of long chain branches characterized by a dimensionless Long Chain Branching Factor (LCBF) of less than 0.001.

In an embodiment, the second component produced with the second homogenous catalyst formulation contains a detectable level of long chain branches characterized by an LCBF greater than 0.001. The LCBF of the second component (LCBF$^2$) may be less than or equal to about 0.05, in other cases less than or equal to about 0.025, in other cases less than or equal to about 0.017 and in still other cases less than or equal to about 0.013 (dimensionless). The LCBF of the second component may be greater than or equal to about 0.0011, or in other cases greater than or equal to about 0.0013, or in other cases greater than or equal to about 0.0014 or in still other cases greater than or equal to about 0.0025 (dimensionless). The LCBF of the of the second component (LCBF$^2$) correlates to the LCBF of the ethylene interpolymer product (LCBF$^{overall}$) according to LCBF$^2$=LCBF$^{overall}$/wt$^2$ wherein wt$^2$ is the weight fraction of the second component.

Number-Average Relaxation Time of Ethylene Interpolymer Products

It is well-known to a skilled person that zero-shear viscosity of PE-like melts with industrially-applicable $M_w$s scales with weight-average molecular weight according to a power-law-like relationship having a power-law exponent ranging from 3.4 to 3.6 (i.e., $\eta_0 \sim M_w^{3.4 \cdots 3.6}$). It is further known that the self-diffusion coefficient of a well-entangled polymer melt scales with $M_w^{-2}$. It is further known to a skilled person that, beside molecular weight, other structural parameters such as polydispersity, LOB content and topologies, SCB type and content, etc. can impact these scaling behaviors.

In the present disclosure, it was assumed that the self-diffusion of the ethylene interpolymer product inversely scales with the number-average relaxation time $\tau_n$ (in ms) defined by ratio of $\eta_0/G_N^0$ in which $G_N^0$ (in MPa) is the plateau modulus calculated according to the relationship proposed by Nobile and Cocchini in Rheologica Acta, 2001, 40, pp 111-119 (a more relevant equation is provided by Liu et al. in Polymer, 2006, 47, pp 4461-4479 and by Ansari et al. in Polymer testing, 2018, 67, pp 266-274) as follows:

$$\log\left(\frac{G_N^0}{G_x}\right) = \frac{0.524 - 0.341\log(M_w/M_n) + 1.843\log(M_z/M_w))}{1 - 0.559\log(M_w/M_n) + 0.841\log(M_z/M_w)} \quad \text{(Eq. 8)}$$

in which $G_x$ is the crossover modulus in a dynamic moduli versus angular frequency plot obtained at 190° C. and $M_w/M_n$ and $M_z/M_w$ are ratios of molecular weight distribution moments determined by conventional GPC.

The zero-shear viscosity $\eta_0$ (in kPa·s) was determined at 190° C. by fitting a 4-parameter Carreau-Yasuda viscosity model into the complex viscosity versus angular frequency defined by:

$$|\eta^*| = \eta_0[1 + (\tau_c\omega)^a]^{\frac{n-1}{a}} \quad \text{(Eq. 9)}$$

in which $|\eta^*|$ is complex viscosity measured as a function of angular frequency $\omega$, $\alpha$ is a parameter determining the breadth of transition from a Newtonian plateau to shear-thinning region with a slope of n−1 in a log-log plot. Detailed information regarding the applied DMA frequency sweep experiments at 190° C., used to obtain complex viscosity $|\eta^*|$ as a function of angular frequency $\omega$, is fully described in the 'Testing Methods' section of this disclosure. In the present disclosure the parameter n is set to a constant value of 2/11 and rest of model parameters were fitted by a least square method.

In the present disclosure, the obtained number-average relaxation times $\tau_n$s were shifted to any desired temperature T (in ° C.) in the melt-state using the time-temperature superposition (tTS) principle as follows:

$$\tau_n(T) = \tau_n(190° \text{ C.}) \exp\left[\frac{1000E_a}{R}\left(\frac{1}{T+273.15} - \frac{1}{463.15}\right)\right] \quad \text{(Eq. 10)}$$

wherein $\tau_n$ (190 ° C.) is the number-average relaxation time $\tau_n$ at 190° C. calculated as the ratio of zero-shear viscosity and plateau modulus at 190° C., $E_a$ is an Arrhenius type flow activation energy (FAE) and R is the universal gas constant having a value of 8.3143 J $\text{mol}^{-1}$ $\text{K}^{-1}$. The FAE of the ethylene interpolymer product can be calculated using tTS (time-temperature superposition principle) shifting of the complex viscosity curves obtained at multiple temperatures and then by fitting the Arrhenius equation to the obtained horizontal shift factors, $a_T$s, of each temperature with a rheology data analysis software according to an $a_T(T) \sim \exp(E_a/RT)$ relationship (e.g., see Eq. 2 of Lohse et al. in Macromolecules 2002, 35, pp. 3066-3075). A similar method as Eq. 10 can be used to shift the Carreau-Yasuda zero-shear viscosity $\eta_0$ determined at 190° C. to any temperature in the melt-state.

In embodiments of this disclosure, the ethylene interpolymer product has a number-average relaxation time $\tau_n$ at 190° C. greater than or equal to 2 and less than or equal to 15 ms, or greater than or equal to 5 and less than or equal to 15 ms, or greater than or equal to 5 t and less than or equal to 12 ms. In a further embodiment of this disclosure, the ethylene interpolymer product has a number-average relaxation time $\tau_n$ greater than or equal to 5 t and less than or equal 10 ms.

In embodiments of this disclosure, the ethylene interpolymer product has an Arrhenius type flow activation energy $E_a$ greater than or equal to 33 and less than or equal to 45 kJ/mol, or greater than or equal to 35 and less than or equal to 42 kJ/mol, or greater than or equal to 35 and less than or equal to 40 kJ/mol.

In embodiments of this disclosure, the ethylene interpolymer product is in a fully molten state at about $T_m+30°$ C., wherein $T_m$ is a DSC endothermic peak during $2^{nd}$-heating cycle with the highest melting temperature.

In embodiments of this disclosure, the ethylene interpolymer product has a number-average relaxation $\tau_n$ time at $T_m+30°$ C. less than 80 ms, or less than 60 ms, or less than 50 ms; wherein $T_m$ is a highest DSC peak melting temperature during $2^{nd}$-heating cycle and said number-average relaxation time at $T_m+30°$ C., $\tau_n(T_m+30°$ C.), is calculated using following equation:

$$\tau_n(T_m + 30° \text{ C.}) = \quad \text{(Eq. 11)}$$
$$\tau_n(190° \text{ C.}) \exp\left[\frac{1000E_a}{R}\left(\frac{1}{T_m + 303.15} - \frac{1}{463.15}\right)\right]$$

wherein $\tau_n$(190° C.) is number-average relaxation time measured at 190° C. in milliseconds, $E_a$ is Arrhenius flow activation energy in kJ/mol and R is the gas constant having a value of 8.314 J/(mol.Kelvin).

In further embodiments of this disclosure, the ethylene interpolymer product has a number-average relaxation time $\tau_n$ at $T_m+30°$ C. greater than 27 ms, or greater than 30 ms, or greater than 32 ms; wherein $T_m$ is a highest DSC peak melting temperature during $2^{nd}$-heating cycle and said number-average relaxation time $\tau_n$ at $T_m+30°$ C., $\tau_n(T_m+30°$ C.), is calculated according to Eq. 11.

In embodiments of this disclosure, the ethylene interpolymer product has a zero-shear viscosity at $T_m+30°$ C. less than 60 kPa·s, or less than 55 kPa·s, or less than 50 kPa·s; wherein $T_m$ is a highest DSC peak melting temperature during $2^{nd}$-heating cycle and said zero-shear viscosity at $T_m+30°$ C., $\eta_0$ ($T_m+30°$ C.), is calculated according to Eq. 11 by replacing $\tau_n(T_m+30°$ C.) and $\tau_n(190°$ C.) with $\eta_0(T_m+30°$ C.) and Carreau-Yasuda $\eta_0$ at 190° C.

In further embodiments of this disclosure, the ethylene interpolymer product has a zero-shear viscosity at $T_m+30°$ C. greater than 30 kPa·s, or greater than 32 kPa·s or greater than 35 kPa·s; wherein $T_m$ is a highest DSC peak melting temperature during $2^{nd}$-heating cycle and said zero-shear viscosity at $T_m+30°$ C., $\eta_0(T_m+30°$ C.), is calculated according to Eq. 11 by replacing $\tau_n(T_m+30°$ C.) and $\tau_n(190°$ C.) with $\eta_0(T_m+30°$ C.) and Carreau-Yasuda $\eta_0$ at 190° C.

Without wishing to be limited by any theory, the ethylene interpolymer products disclosed herein have a particular LCB placement and content of long-chain branched species enabling an optimized relaxation process and thermo-rheological behavior leading to polyethylene compositions with fast self-diffusion process combined with improved interfacial adhesion and resistance against peel stresses during the heat-sealing process.

Testing Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Ethylene interpolymer product densities were determined using ASTM D792-13 (Nov. 1, 2013).

Melt Index

Ethylene interpolymer product melt index was determined using ASTM D1238 (Aug. 1, 2013). Melt indexes, $I_2$ and $I_{21}$ were measured at 190° C., using weights of 2.16 kg and 21.6 kg, respectively.

Conventional Size Exclusion Chromatography (SEC)

Ethylene interpolymer product samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four SHO-DEX columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 µL. The GPC columns were calibrated with narrow distribution polystyrene standards. The polystyrene molecular weights were converted to polyethylene molecular weights using the Mark-Houwink equation, as described in the ASTM standard test method D6474-12 (December 2012). The GPC raw data were processed with the Cirrus GPC software, to produce molar mass averages ($M_n$, $M_w$, $M_z$) and molar mass distribution (e.g. Polydispersity, $M_w/M_n$). In the polyethylene art, a commonly used term that is equivalent to SEC is GPC, i.e. Gel Permeation Chromatography.

Triple Detection Size Exclusion Chromatography (3D-SEC)

Ethylene interpolymer product samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Sample solutions were chromatographed at 140° C. on a PL 220 high-temperature chromatography unit equipped with a differential refractive index (DRI) detector, a dual-angle light scattering detector (15 and 90 degree) and a differential viscometer. The SEC columns used were either four SHO-DEX columns (HT803, HT804, HT805 and HT806), or four PL Mixed ALS or BLS columns. TCB was the mobile phase with a flow rate of 1.0 mL/minute, BHT was added to the mobile phase at a concentration of 250 ppm to protect SEC columns from oxidative degradation. The sample injection volume was 200 µL. The SEC raw data were processed with the CIRRUS® GPC software, to produce absolute molar masses and intrinsic viscosity ($[\eta]$). The term "absolute" molar mass was used to distinguish 3D-SEC determined absolute molar masses from the molar masses determined by conventional SEC. The viscosity average molar mass ($M_v$) determined by 3D-SEC was used in the calculations to determine the Long Chain Branching Factor (LCBF).

Composition Distribution Branching Index (CDBI)

The "Composition Distribution Branching Index", hereinafter CDBI, of the disclosed Examples and Comparative Examples were measured using a CRYSTAF/TREF 200+ unit equipped with an IR detector, hereinafter the CTREF. The acronym "TREF" refers to Temperature Rising Elution Fractionation. The CTREF was supplied by PolymerChar S.A. (Valencia Technology Park, Gustave Eiffel, 8, Paterna, E-46980 Valencia, Spain). The CTREF was operated in the TREF mode, which generates the chemical composition of the polymer sample as a function of elution temperature, the Co/Ho ratio (Copolymer/Homopolymer ratio) and the CDBI (the Composition Distribution Breadth Index), i.e. $CDBI_{50}$ and $CDBI_{25}$. A polymer sample (80 to 100 mg) was placed into the reactor vessel of the CTREF. The reactor vessel was filled with 35 ml of 1,2,4-trichlorobenzene (TCB) and the polymer was dissolved by heating the solution to 150° C. for 2 hours. An aliquot (1.5 mL) of the solution was then loaded into the CTREF column which was packed with stainless steel beads. The column, loaded with sample, was allowed to stabilize at 110° C. for 45 minutes. The polymer was then crystallized from solution, within the column, by dropping the temperature to 30° C. at a cooling rate of 0.09° C./minute. The column was then equilibrated for 30 minutes at 30° C. The crystallized polymer was then eluted from the column with TCB flowing through the column at 0.75 mL/minute, while the column was slowly heated from 30° C. to 120° C. at a heating rate of 0.25° C./minute. The raw CTREF data were processed using Polymer Char software, an Excel spreadsheet and CTREF software developed in-house. $CDBI_{50}$ was defined as the percent of polymer whose composition is within 50% of the median comonomer composition; $CDBI_{50}$ was calculated from the composition distribution cure and the normalized cumulative integral of the composition distribution curve, as described in U.S. Pat. No. 5,376,439. Those skilled in the art will understand that a calibration curve is required to convert a CTREF elution temperature to comonomer content, i.e. the amount of comonomer in the ethylene/α-olefin polymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference. $CDBI_{25}$ as calculated in a similar manner; $CDBI_{25}$ is defined as the percent of polymer whose composition is with 25% of the median comonomer composition. At the end of each sample run, the CTREF column was cleaned for 30 minutes; specifically, with the CTREF column temperature at 160° C., TCB flowed (0.5 mL/minute) through the column for 30 minutes.

CTREF deconvolutions were performed to determine the amount of branching ($SCB^1$ per 1000 $CH_2s$) and density of the first component using the following equations: $SCB^1$ per 1000 $CH_2s$=74.293–0.7598 ($T^P_{CTREF}$), where ($T^P_{CTREF}$) is the peak elution temperature of the ethylene interpolymer product observed in the CTREF chromatogram and density of the first component was determined according to $\rho^1$=(−$a_1$−($a_1{}^2$−4*$a_0$*($a_2$−($SCB^1$ per$10^3CH_2s$)))$^{0.5}$))/(2*$a_0$); where $a_0$=9341.81, $a_1$=−17765.91, $a_2$=8446.849 and $\tau^1$ was the density of the first component. The $SCB^2$ per 1000 $CH_2s$ and density of the second component was determined using linear blending rules, given the overall SCB per 1000 $CH_2s$ (as determined using ASTM D6645-01 by FTIR spectroscopy; see the section in the 'Testing Methods' dedicated to 'Comonomer Content: Fourier Transform Infrared (FTIR) Spectroscopy') and the overall density of the ethylene interpolymer product determined according to ASTM D792-13.

Neutron Activation (Elemental Analysis)

Neutron Activation Analysis, hereinafter NAA, was used to determine catalyst residues in ethylene interpolymer products as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5\times10^{11}$/ $cm^2$/s. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, TN, USA) and a multichannel analyzer (Ortec model DSPEC Pro). The amount of each element in the sample was calculated from the gamma-ray spectrum and recorded in parts per million relative to the total weight of the ethylene interpolymer product sample. The NAA system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the NAA. system. Standards are used to determine the sensitivity of the NAA procedure (in counts/μg).

Comonomer Content: Fourier Transform Infrared (FTIR) Spectroscopy

The quantity of comonomer in an ethylene interpolymer product was determine by FTIR and reported as the Short Chain Branching (SCB) content having dimensions of number of methyl branches per 1000 carbon atoms or SCB per 100 $CH_2s$. This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Melt Rheology

Oscillatory shear measurements under small strain amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using a cone-plate geometry with a cone-tip angle of 5°, a truncation of 137 μm and a diameter of 25 mm. In this experiment a sinusoidal strain-wave γ(t) was applied, and the stress response τ(t) was analyzed in terms of complex viscosity as a function of imposed angular frequency. The obtained complex viscosity versus angular frequency results were used to determine the LCBF parameter and the number-average relaxation time of ethylene interpolymer products as described below.

To determine the LCBF parameter as outlined in equations 2 through 7, the zero-shear rate viscosity $\eta_0$ (in Poise) of ethylene interpolymer products were obtained by fitting the Ellis model (see R. B. Bird et al. "Dynamics of Polymer Liquids. Volume 1: Fluid Mechanics" Wiley-Interscience Publications (1987) p. 228) to the complex viscosity versus angular frequency results.

To determine the number-average relaxation time $\tau_n$ of ethylene interpolymer products (in ms) defined by ratio of $\eta_0/G_N{}^0$ which $G_N{}^0$ (in MPa) is the plateau modulus calculated according to the relationship in equation 8 proposed by Nobile and Cocchini (Rheologica Acta, 2001, 40, pp 111-119; a more relevant equation is provided by Liu et al. in Polymer, 2006, 47, pp 4461-4479 and by Ansari et al. in Polymer testing, 2018, 67, pp 266-274) and $\eta_0$ is zero-shear viscosity (in kPa·s) obtained by fitting the Carreau-Yasuda model (equation 9; also see K. Yasuda (1979) PhD Thesis, IT Cambridge) to the complex viscosity versus angular frequency results.

The Flow Activation Energy (FAE), $E_a$, having dimensions of kJ/mol was also determined to shift the number-average relaxation time and Carreau-Yasuda zero-shear viscosity of ethylene interpolymer products to any desired temperature T (in ° C.) in the melt-state using the time-temperature superposition (tTS) principle according to equations 10 and 11. The Anton Paar MCR501 rotational rheometer was used to generate the data from which the FAE was calculated; specifically, the melt-state complex viscosity versus angular frequency in a linear regime (from 0.05 to 100 rad/s at 7 data points per decade at a strain-amplitude of 5% at four different temperatures (160, 175, 190 and 205° C.) were measured. Using 190° C. as the reference temperature, a time-temperature-superposition shift was carried out to obtain the horizontal and vertical shift factors. The FAE of each sample was calculated using tTS (time-temperature superposition) shifting of the complex viscosity curves and fitting the Arrhenius equation to the horizontal shift factors, $a_Ts$, of each temperature with RheoPlus and Orchestrator software according to an $a_T(T)$~exp ($E_a$/RT) relationship.

Film Dart Impact

Film dart impact strength was determined using ASTM D1709-09 Method A (May 1, 2009). In this disclosure the dart impact test employed a 1.5 inch (38 mm) diameter hemispherical headed dart.

Film Lubricated Puncture

The "lubricated puncture" or "Lubricated Puncture Resistance" test was performed as follows: the energy (in J/mm) required to puncture a film sample was determined using a 0.75 inch (1.9 cm) diameter pear-shaped fluorocarbon coated probe travelling at 10 inch per minute (25.4 cm per minute) employing ASTM conditions (ASTM D5748-95). Prior to testing the specimens, the probe head was manually lubricated with Muko Lubricating Jelly to reduce friction. Muko Lubricating Jelly is a water-soluble personal lubricant available from Cardinal Health Inc., 1000 Tesma Way, Vaughan, ON L4K 5R8 Canada. The probe was mounted in an Instron Model 5 SL Universal Testing Machine and a 1000-N load cell as used. Film samples 1.0 mil (25 μm) thick, 5.5 inch (14 cm) wide and 6 inch (15 cm) long were mounted in the Instron and punctured.

Film Tensile

The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft.lb/in$^3$). Tensile properties were measured in the both the machine direction (MD) and the transverse direction (TD) of the blown films.

Film Secant Modulus

The secant modulus is a measure of film stiffness. Secant moduli were determined according to ASTM D882. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inches long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Film Elmendorf Tear

Film tear performance was determined by ASTM D1922-09 (May 1, 2009); an equivalent term for tear is "Elmendorf tear". Film tear was measured in both the machine direction (MD) and the transverse direction (TD) of the blown films.

Film Opticals

Film optical properties were measured as follows: Haze, ASTM D1003-13 (Nov. 15, 2013), and Gloss ASTM D2457-13 (Apr. 1, 2013).

Film Hot Tack

In this disclosure, the "Hot Tack Test" was performed as follows, using ASTM conditions. Hot tack data was generated using a J&B Hot Tack Tester which is commercially available from Jbi Hot Tack, Geloeslaan 30, B-3630 Maamechelen, Belgium. In the hot tack test, the strength of a polyolefin to polyolefin seal is measured immediately after heat sealing two film samples together, i.e., when the polyolefin macromolecules that comprise the film are in a semi-molten state. This test simulates the heat sealing of polyethylene films on high speed automatic packaging machines, e.g., vertical or horizontal form, fill and seal equipment. The following parameters were used in the J&B Hot Tack Test: film specimen width, 1 inch (25.4 mm); film sealing time, 0.5 second; film sealing pressure, 0.27 N/mm$^2$; delay time, 0.5 second; film peel speed, 7.9 in/second (200 mm/second); testing temperature range, 176° F. to 293° F. (80° C. to 145° C.); temperature increments, 9° F. (5° C.); and five film samples were tested at each temperature increment to calculate average values at each temperature. The peak hot tack strength in Newtons, the maximum hot tack force observed (average of 5-film samples) over the testing temperature range was recorded for the disclosed Example films and Comparative Example films.

Film Hexane Extractables

Hexane extractables was determined according to the Code of Federal Registration 21 CFR § 177.1520 Para (c) 3.1 and 3.2; wherein the quantity of hexane extractable material in a film is determined gravimetrically. Elaborating, 2.5 grams of 3.5 mil (89 μm) monolayer film was placed in a stainless steel basket, the film and basket were weighed ($w^i$). While in the basket the film was: extracted with n-hexane at 49.5° C. for two hours; dried at 80° C. in a vacuum oven for 2 hours; cooled in a desiccator for 30 minutes, and; weighed ($w^f$). The percent loss in weight is the percent hexane extractables ($w^{C6}$): $w^{C6}=100\times(w^i-w^f)/w^i$.

The following examples are presented for the purpose of illustrating selected embodiments of this disclosure, it being understood that, the examples presented hereinafter do not limit the claims presented.

EXAMPLES

Ethylene Interpolymer Products

Embodiments of the ethylene interpolymer products in the present disclosure were prepared in a continuous solution pilot plant operated in parallel mode. In the parallel mode operation, the exit streams exiting each of a first reactor (R1)

and a second reactor (R2) are combined downstream of each reactor and the polymer product is obtained after devolatilization.

Examples 1 and 2 of ethylene interpolymer products were produced in the parallel mode where both R1 and R2 CSTRs were agitated to give conditions in which the reactor contents were well mixed. The first and second reactor pressure was about 16,000 kPa (about $2.3 \times 10^3$ psi). The first reactor was operated at a lower temperature than the second reactor. The first reactor had a volume of 12 liters and the second reactor had a volume of 24 liters. The process was operated continuously by feeding fresh process solvent, ethylene, 1-octene and hydrogen to the reactors. Methylpentane was used as the process solvent (a commercial blend of methylpentane isomers). Monomer (ethylene) and comonomer (1-octene) were purified prior to addition to the reactor using conventional feed preparation systems (such as contact with various absorption media to remove impurities such as water, oxygen and polar contaminants). The reactor feeds were pumped to the reactors at the ratios shown in Table 1 A for Examples 1 and 2. Average residence times for the reactors are calculated by dividing average flow rates by reactor volume. The residence time in each reactor for all of the inventive experiments (Examples 1 and 2) was less than 10 minutes.

The following unbridged single site catalyst formulation was used to prepare the first homogeneous catalyst formulation that was injected into R1 to produce the first component: cyclopentadienyl tri(tertiary butyl)phosphinimine titanium dichloride [Cp[(t-Bu)$_3$PN]TiCl$_2$]; methylaluminoxane (MMAO-07); trityl tetrakis(pentafluoro-phenyl)borate; and 2,6-di-tert-butyl-4-ethylphenol (BHBE). Methylaluminoxane (MMAO-07) and 2,6-di-tert-butyl-4-ethylphenol are premixed in-line and then combined with cyclopentadienyl tri(tertiary butyl)phosphinimine titanium dichloride and trityl tetrakis(pentafluoro-phenyl)borate just before entering the polymerization reactor (R1).

The following bridged metallocene catalyst formulation was used to prepare the second homogeneous catalyst formulation that was injected into a second reactor R2 configured in parallel to the first reactor (R1) to produce the second component with a molecular weight lower than the first component: diphenylmethylene(cyclopentadienyl)(2,7-di-t-butylfuorenyl)hafnium dimethyl [(2,7-tBu$_2$Flu)Ph$_2$C(Cp) HfMe$_2$]; methylaluminoxane (MMAO-07); trityl tetrakis (pentafluoro-phenyl)borate, and; 2,6-di-tert-butyl-4-ethylphenol (BHBE). Methylaluminoxane (MMAO-07) and 2,6-di-tert-butyl-4-ethylphenol are premixed in-line and then combined with diphenylmethylene(cyclopentadienyl) (2,7-di-t-butylfuorenyl)hafnium dimethyl and trityl tetrakis (pentafluoro-phenyl)borate just before entering the polymerization reactor (R2).

The quantity of the first homogenous catalyst formulation added to reactor 1 (R1) shown in Table 1A, e.g. "R1 catalyst (ppm)" was 0.25 and 0.37 of cyclopentadienyl tri(tertiary butyl)phosphinimine titanium dichloride [Cp[(t-Bu)$_3$PN] TiCl$_2$] in the case of Example 1 and 2, respectively. The efficiency of the first homogeneous catalyst formulation was optimized by adjusting the mole ratios of the catalyst components (see Table 1A) and the R1 catalyst inlet temperature. The catalyst inlet temperature of the unbridged single site catalyst formulation was about 25° C. to about 40° C.

In Examples 1 and 2, a second homogeneous catalyst formulation was injected into the second reactor (R2), e.g., a bridged metallocene catalyst formulation, containing diphenylmethylene(cyclopentadienyl)(2,7-di-t-butylfuorenyl)hafnium dimethyl [(2,7-tBu$_2$Flu)Ph$_2$C(Cp)HfMe$_2$] as specified in Table 1A. The efficiency of the second homogeneous catalyst formulation was optimized by adjusting the mole ratios of the catalyst components (see Table 1A) and the R2 catalyst inlet temperature. The catalyst inlet temperature of the bridged metallocene catalyst formulation was about 25° C. to about 40° C.

Polymerization in the continuous solution polymerization process was terminated by adding a catalyst deactivator downstream of the reactors. The catalyst deactivator used was octanoic acid (caprylic acid), commercially available from P&G Chemicals, Cincinnati, OH, U.S.A. The catalyst deactivator was added such that the moles of fatty acid added were 50% of the total molar amount of hafnium, titanium and aluminum added to the polymerization process; to be clear, the moles of octanoic acid added=0.5×(moles hafnium+moles titanium+moles aluminum); this mole ratio was consistently used in the case of Examples 1 and 2 and Comparative 1. A two-stage devolitizing process was employed to recover the ethylene interpolymer product from the process solvent, i.e., two vapor/liquid separators were used and the second bottom stream (from the second V/L separator) was passed through a gear pump/pelletizer combination. Prior to pelletization, the ethylene interpolymer product was stabilized by adding 500 ppm of IRGANOX® 1076 (a primary antioxidant) and 500 ppm of IRGAFOS® 168 (a secondary antioxidant), based on weight of the ethylene interpolymer product. Antioxidants were dissolved in process solvent and added between the first and second V/L separators.

Comparative Example 1 was an ethylene/1-octene copolymer comprising two dissimilar molecular weight components prepared in the continuous solution pilot plant by injecting the bridged metallocene catalyst formulation comprising diphenylmethylene(cyclopentadienyl)(2,7-di-t-butylfuorenyl)hafnium dimethyl [(2,7-tBu$_2$Flu)Ph$_2$C(Cp) HfMe$_2$ into both R1 and R2 reactors (R1 and R2 were configured in series; see reactors operating conditions in Table 1B).

TABLE 1A

| Reactors Operating Conditions for Example 1 and Example 2 | | |
| --- | --- | --- |
| | Example 1 | Example 2 |
| Total Solution Rate (kg/h) | 450.0 | 450.0 |
| Polymer Production Rate (kg/h) | 42.5 | 44.5 |
| First Reactor (R1) | | |
| R1 Ethylene Split (%) | 55.00 | 55.45 |
| R1 Solution Rate (kg/h) | 303.7 | 308.5 |
| R1 Ethylene Concentration (wt. %) | 7.0 | 7.3 |
| R1 Octene/Ethylene (weight fraction) | 1.61 | 1.60 |
| R1 Primary Feed Temperature (° C.) | 44.0 | 36.5 |
| R1 Mean Temperature (° C.) | 127.1 | 126.5 |
| R1 Agitator Speed (rpm) | 715.8 | 690.2 |
| R1 Hydrogen (ppm) | 0.40 | 0.29 |
| R1 Ethylene Conversion (%) | 88.6 | 88.0 |
| R1 Catalyst$^a$ (ppm) | 0.25 | 0.37 |
| R1 Al/Ti (mole ratio) | 125 | 125 |
| R1 BHBE$^b$/Al (mole ratio) | 0.30 | 0.34 |
| R1 B/Ti (mole) | 2.00 | 2.00 |
| Second Reactor (R2) | | |
| R2 Solution Rate (kg/h) | 146.3 | 141.5 |
| R2 Ethylene Concentration (wt. %) | 11.9 | 12.8 |
| R2 Octene/Ethylene (weight fraction) | 0.36 | 0.25 |
| R2 Primary Feed Temperature (° C.) | 55.0 | 54.9 |
| R2 Mean Temperature (° C.) | 186.8 | 191.4 |
| R2 Agitator Speed (rpm) | 690.0 | 690.0 |
| R2 Hydrogen (ppm) | 1.80 | 1.80 |

TABLE 1A-continued

Reactors Operating Conditions for Example 1 and Example 2

| | Example 1 | Example 2 |
|---|---|---|
| R2 Ethylene Conversion (%) | 85.0 | 85.0 |
| R2 Catalyst[c] (ppm) | 0.39 | 0.38 |
| R2 Al/Hf (mole ratio) | 51 | 51 |
| R2 BHBE/Al (mole ratio) | 0.41 | 0.09 |
| R2 B/Hf (mole) | 2.03 | 2.03 |

[a] cyclopentadienyl tri(tertiary butyl)phosphinimine titanium dichloride [Cp[(t-Bu)$_3$PN]TiCl$_2$]
[b] 2,6-di-tert-butyl-4-ethylphenol
[c] diphenylmethylene(cyclopentadienyl)(2,7-di-t-butylfuorenyl)hafnium dichloride [(2,7-tBu$_2$Flu)Ph$_2$C(Cp)HfMe$_2$]

TABLE 1B

Reactors Operating Conditions for Comparative Example 1

| | Comparative Example 1 |
|---|---|
| Total Solution Rate (kg/h) | 550.0 |
| Polymer Production Rate (kg/h) | 69.3 |
| First Reactor (R1) | |
| R1 Ethylene Split (%) | 38 |
| R1 Solution Rate (kg/h) | 266.0 |
| R1 Ethylene Concentration (wt. %) | 9.9 |
| R1 Octene/Ethylene (weight fraction) | 0.3 |
| R1 Primary Feed Temperature (° C.) | 30.0 |
| R1 Mean Temperature (° C.) | 140.0 |
| R1 Agitator Speed (rpm) | 690.0 |
| R1 Hydrogen (ppm) | 2.75 |
| R1 Ethylene Conversion (%) | 80.0 |
| R1 Catalyst[a] (ppm) | 0.85 |
| R1 Al/Hf (mole ratio) | 50 |
| R1 BHBE[b]/Al (mole ratio) | 0.4 |
| R1 B/Hf (mole) | 1.2 |
| Second Reactor (R2) | |
| R2 Solution Rate (kg/h) | 284.0 |
| R2 Ethylene Concentration (wt. %) | 12.6 |
| R2 Octene/Ethylene (weight fraction) | 0.46 |
| R2 Primary Feed Temperature (° C.) | 30.0 |
| R2 Mean Temperature (° C.) | 180.0 |

TABLE 1B-continued

Reactors Operating Conditions for Comparative Example 1

| | Comparative Example 1 |
|---|---|
| R2 Agitator Speed (rpm) | 690.0 |
| R2 Hydrogen (ppm) | 16.0 |
| R2 Ethylene Conversion (%) | 80.1 |
| R2 Catalyst[a] (ppm) | 0.60 |
| R2 Al/Hf (mole ratio) | 31 |
| R2 BHBE/Al (mole ratio) | 0.40 |
| R2 B/Hf(mole) | 1.20 |

[a] diphenylmethylene(cyclopentadienyl)(2,7-di-t-butylfuorenyl)hafnium dichloride [(2,7-tBu$_2$Flu)Ph$_2$C(Cp)HfMe$_2$]
[b] 2,6-di-tert-butyl-4-ethylphenol

TABLE 2

Examples 1 and 2 Physical, Architectural, Thermal and Rheological Properties

| | | Example 1 | Example 2 |
|---|---|---|---|
| I$_2$ (dg/min) | | 0.92 | 0.78 |
| Density (g/cc) | | 0.9045 | 0.9078 |
| MFR, I$_{21}$/I$_2$ | | 26 | 25 |
| M$_n$ | | 36560 | 39229 |
| M$_w$ | | 98311 | 99705 |
| M$_z$ | | 190820 | 194568 |
| M$_w$/M$_n$ | | 2.69 | 2.54 |
| SCB per 10$^3$ CH$_2$s | | 22.2 | 19.5 |
| 1-Octene mole percent | | 4.4 | 3.9 |
| CDBI$_{50}$ | | 86.1 | 89.1 |
| T$^P_{CTREF}$ (° C.) | | 70.3 | 70.8 |
| T$_m$ (° C.) | | 100.5 | 103.5 |
| LCBF (—) | | 0.0013 | 0.0019 |
| $\tau_n$ (ms) at 190° C. | | 9.7 | 11.2 |
| $\tau_n$ (ms) at T$_m$ + 30° C. | | 39.2 | 42.4 |
| $\eta_0$ (kPa · s) | | 9.4 | 11.7 |
| $\eta_0$ (kPa · s) at T$_m$ + 30° C. | | 37.9 | 44.4 |
| G$_N^0$ (MPa) | | 0.97 | 1.05 |
| E$_a$ (kJ/mol) | | 36.5 | 37.0 |
| Crossover Modulus (kPa) | | 120.1 | 130.3 |
| Catalytic Metal Residues (ppm) | Hf | 0.23 ± 0.02 | 0.21 ± 0.02 |
| | Ti | <0.20 | 0.14 ± 0.06 |

TABLE 3A

First and Second Components Basic Physical and Molecular Features in Examples 1 and 2

| | First Component | | Second Component | |
|---|---|---|---|---|
| | Ex. 1 | Ex. 2 | Ex. 1 | Ex. 2 |
| Catalyst Type | Unbridged Single Site Catalyst | | Bridged Metallocene Catalyst | |
| Weight Fraction (wt. %) | 0.53 | 0.50 | 0.47 | 0.50 |
| SCB per 10$^3$ CH$_2$s | 20.88 [a] | 20.50 [a] | 23.71 [b] | 18.31 [b] |
| Density, $\rho$ (g/cm$^3$) | 0.9038 [c] | 0.9043 [c] | 0.9052 [d] | 0.9120 [d] |
| I$_2$ (g/10 min) | 0.25 [e] | 0.24 [e] | 18.62 [e] | 10.69 [e] |
| M$_n$ | 64919 | 64821 | 19984 | 22822 |
| M$_w$ | 138588 | 140357 | 46250 | 53340 |
| M$_z$ | 208227 | 211219 | 70587 | 81610 |

TABLE 3A-continued

First and Second Components Basic Physical and Molecular Features in Examples 1 and 2

| | First Component | | Second Component | |
| --- | --- | --- | --- | --- |
| | Ex. 1 | Ex. 2 | Ex. 1 | Ex. 2 |
| $M_w/M_n$ | 2.13 | 2.17 | 2.31 | 2.34 |
| LCBF | <0.001[f] | <0.001[f] | 0.0028[g] | 0.0038[g] |

[a] $SCB^1$, the number of hexyl branches per thousand backbone carbon atoms of the first component, = 74.29-0.7598 ($T^P_{CTREF}$); where ($T^P_{CTREF}$) is the peak elution temperature of the ethylene interpolymer product observed in the CTREF chromatogram.
[b] SCB2, the number of hexyl branches per thousand backbone carbon atoms of the second component is determined by considering a linear branch frequency mixing rule and the respective weight fractions of the second and first components; $SCB^2 = (SCB^{overall} - wt^1 * SCB^1)/(wt^2)$. Values for $SCB^{overall}$ are taken from Table 2.
[c] $\rho^1 = (-a_1 - (a_1^2 - 4*a_0*(a_2 - (SCB^1 \text{ per } 10^3 CH_2s)))^{0.5})/(2*a_0)$; where $a_0 = 9341.81$, $a_1 = -17765.91$ and $a_2 = 8446.849$
[d] $\rho^2 = (\rho^{overall} - wt^1*\rho^1)/(wt^2)$; where $\rho^2$, $\rho^1$ and $\rho^{overall}$ are the densities of the second component, the first component and the overall (the ethylene interpolymer product) densities, respectively; and $wt^2$ and $wt^1$ represent the respective weight fractions of the second and first components.
[e] Melt Index ($I_2$, dg/min): Log $I_2$ = 7.8998042-3.9089344*log($M_w$/1000) − 0.27994391*$M_n$/$M_w$; where $M_n$ and $M_w$ are number-average and weight-average molecular weights of the respective component and $M_n$ is number average molecular weight of the respective component (i.e. the first or the second components)
[f] Undetectable levels of LCB; i.e., LCBF < 0.001.
[g] $LCBF^2 = LCBF^{overall}/wt^2$, where $LCBF^{overall}$, $LCBF^2$ and $wt^2$ are the experimentally determined LCBF of the ethylene interpolymer product, the LCBF of the second component and the weight fraction of the second component.

TABLE 3B

First and Second Components Basic Physical and Molecular Features in Comparative Example 1

| Catalyst Type | First Component | Second Component |
| --- | --- | --- |
| | Bridged Metallocene Catalyst | |
| Weight Fraction (wt. %) | 0.32 | 0.68 |
| SCB per $10^3$ $CH_2s$ | 24.07 [a] | 23.09 [b] |
| Density, $\rho$ (g/cm³) | 0.9003 [c] | 0.9065 [d] |
| $I_2$ (g/10 min) | 0.13 [e] | 53.65 [e] |
| $M_n$ | 74827 | 15879 |
| $M_w$ | 164566 | 35169 |
| $M_z$ | 257271 | 55186 |
| $M_w/M_n$ | 2.2 | 2.2 |
| LCBF | >0.001 | >0.001 |

[a] $SCB^1$, the number of hexyl branches per thousand backbone carbon atoms of the first component, = 74.29-0.7598 ($T^P_{CTREF}$); where ($T^P_{CTREF}$) is the peak elution temperature of the ethylene interpolymer product observed in the CTREF chromatogram.

TABLE 3B-continued

First and Second Components Basic Physical and Molecular Features in Comparative Example 1

| Catalyst Type | First Component | Second Component |
| --- | --- | --- |
| | Bridged Metallocene Catalyst | |

[b] $SCB^2$, the number of hexyl branches per thousand backbone carbon atoms of the second component is determined by considering a linear branch frequency mixing rule and the respective weight fractions of the second and first components; $SCB^2 = (SCB^{overall} - wt^1 * SCB^1)/(wt^2)$. Values for $SCB^{overall}$ are taken from Table 2.
[c] $\rho^1 = (-a_1 - (a_1^2 - 4*a_0*(a_2 - (SCB^1 \text{ per } 10^3 CH_2s)))^{0.5})/(2*a_0)$; where $a_0 = 9341.81$, $a_1 = -17765.91$ and $a_2 = 8446.849$
[d] $\rho^2 = (\rho^{overall} - wt^1*\rho^1)/(wt^2)$; where $\rho^2$, $\rho^1$ and $\rho^{overall}$ are the densities of the second component, the first component and the overall (the ethylene interpolymer product) densities, respectively; and $wt^2$ and $wt^1$ represent the respective weight fractions of the second and first components.
[e] Melt Index ($I_2$, dg/min): Log $I_2$ = 7.8998042-3.9089344*log($M_w$/1000) − 0.27994391*$M_n$/$M_w$; where $M_n$ and $M_w$ are number-average and weight-average molecular weights of the respective component and $M_n$ is number average molecular weight of the respective component (i.e. the first or the second components)

TABLE 4

Comparative Examples 1 to 6 Physical, Molecular, Thermal and Rheological Properties

| | | Comp. 1 | Comp. 2 | Comp. 3 | Comp. 4 |
| --- | --- | --- | --- | --- | --- |
| $I_2$ (dg/min) | | 0.93 | 0.99 | 0.85 | 1.14 |
| Density (g/cc) | | 0.9045 | 0.9162 | 0.9117 | 0.9093 |
| MFR, $I_{21}/I_2$ | | 57 | 32.2 | 31.4 | 36.2 |
| $M_n$ | | 27546 | 32298 | 33139 | 38112 |
| $M_w$ | | 91509 | 100589 | 118358 | 82272 |
| $M_z$ | | 246101 | 222368 | 379353 | 149535 |
| $M_w/M_n$ | | 3.32 | 3.11 | 3.6 | 2.2 |
| SCB per $10^3$ $CH_2s$ | | 23.4 | 14.6 | 19.2 | 18.6 |
| $CDBI_{50}$ | | 89.3 | 70.9 | 55.3 | 86.7 |
| $T^P_{CTREF}$ (° C.) | | 66.1 | 77.9 and 94.8 | 69.2 and 95.5 | 72.9 |
| $T_m^{max}$ (° C.) | | 99.2 | 112.5 | 121.6 | 103.5 |
| LCBF (—) | | 0.044 | <0.001 | <0.001 | 0.067 |
| $\tau_n$ (ms) at 190° C. | | 63.7 | 10.4 | 8.8 | 32.4 |
| $\tau_n$ (ms) at $T_m^{max}$ + 30° C. | | 424.4 | 25.9 | 18.1 | 288.8 |
| $\eta_0$ (kPa · s) at 190° C. | | 42.8 | 9.3 | 14 | 23.6 |
| $\eta_0$ (kPa · s) at $T_m^{max}$ + 30° C. | | 285.5 | 23.1 | 28.9 | 210.2 |
| $G_N^0$ (MPa) | | 0.67 | 0.89 | 1.6 | 0.73 |
| $E_a$ (kJ/mol) | | 48.3 | 30.8 | 31.1 | 60.6 |
| Crossover Modulus (kPa) | | 58.1 | 93.9 | 117 | 100.2 |
| Catalytic Metal | Hf | 1.76 | n.d. | n.d. | 0.24 |
| Residues (ppm) | Ti | n.d.* | 0.41 ± 0.03 | 8.27 | n.d. |

TABLE 4-continued

Comparative Examples 1 to 6 Physical, Molecular,
Thermal and Rheological Properties

| | | Comp. 5 | Comp. 6 | Comp. 7 |
|---|---|---|---|---|
| $I_2$ (dg/min) | | 0.92 | 0.98 | 0.88 |
| Density (g/cc) | | 0.9131 | 0.9116 | 0.9091 |
| MFR, $I_{21}/I_2$ | | 16.7 | 16.7 | 34.7 |
| $M_n$ | | 67274 | 48526 | 42720 |
| $M_w$ | | 107006 | 101890 | 81470 |
| $M_z$ | | 162476 | 167833 | 136620 |
| $M_w/M_n$ | | 1.6 | 2.1 | 1.9 |
| SCB per $10^3$ $CH_2$s | | 14.2 | 15.9 | 17.7 |
| $CDBI_{50}$ | | 73 | 71.6 | 83.9 |
| $T^P_{CTREF}$ (° C.) | | 71.9 and 88.7 | 73.6 and 92.5 | 75.9 |
| $T_m^{max}$ (° C.) | | 112.9 | 115.3 | 105.5 |
| LCBF (—) | | <0.001 | <0.001 | 0.077 |
| $\tau_n$ (ms) at 190° C. | | 9.6 | 7.3 | 50.8 |
| $\tau_n$ (ms) at $T_m^{max}$ + 30° C. | | 23.7 | 17 | 485.4 |
| $\eta_0$ (kPa · s) at 190° C. | | 9 | 7.3 | 42.6 |
| $\eta_0$ (kPa · s) at $T_m^{max}$ + 30° C. | | 22.3 | 17 | 407.1 |
| $G_N^0$ (MPa) | | 0.94 | 1 | 0.84 |
| $E_a$ (kJ/mol) | | 30.9 | 30.6 | 65.1 |
| Crossover Modulus (kPa) | | 163.9 | 154.4 | 128.1 |
| Catalytic Metal | Hf | n.d. | n.d. | n.d. |
| Residues (ppm) | Ti | <0.3 | <0.1 | 0.33 |

*not detectable, i.e., below detection limit

Table 2 discloses the physical, molecular, thermal and rheological attributes of Examples 1 and 2. The catalytic metal residues originating from the first and second homogeneous catalysts injected into R1 and R2 were also included in Table 2. The catalyst residues in the ethylene interpolymer product reflect the chemical compositions of the first and second homogeneous catalyst formulations employed to produce the first and second components. Catalyst residues were quantified by measuring the parts per million of catalytic metal in the ethylene interpolymer products using Neutron Activation Analysis (NAA). As shown in Table 2, the ethylene interpolymer product Example 1 contained 0.23 ppm hafnium and less than 0.2 ppm of titanium. Further, as shown in Table 2, the ethylene interpolymer product Example 2 contained 0.21 ppm hafnium and 0.14 ppm of titanium.

As shown in Table 1A, Examples 1 and 2 were produced in a solution pilot plant in reactors 1 and 2 operating in parallel mode. A titanium (Ti) containing unbridged single site catalyst formulation was injected into reactor 1 (R1) and a hafnium (Hf) containing bridged metallocene catalyst formulation was injected into reactor 2 (R2). Further, in Examples 1 and 2, Ti originated from [Cp[(tert-butyl)$_3$PN] TiCl$_2$] species of component A shown in Formula (I) and Hf originated from the (2,7-tBu$_2$Flu)Ph$_2$C(Cp)HfMe$_2$ species of component B shown in Formula (II).

It is also observable that Example 1 and 2 had a number-average relaxation time of less than or equal to 15 ms and greater than or equal to 2 ms combined with an activation energy of less than or equal to 45 kJ/mol. These latter attributes have led to number-average relaxation times smaller than 50 ms at temperatures in the molten state and close to the resins maximum peak melting temperature (e.g., $T_m$+30° C.). A fully molten state is meant to convey a temperature regime above the maximum peak melting temperature ($T_m$ having a value of 100.5° C. and 103.5° C. for Examples 1 and 2, respectively) wherein the DSC thermogram fully returns to the heat-flow baseline during the second-heating cycle. Table 2 further discloses that Examples 1 and 2 had zero-shear viscosities of 9.4 and 11.7 kPa·s at 190° C. These zero-shear viscosity values at 190° C.

combined with the reported flow activation energies corresponded to zero-shear viscosities of 37.9 and 44.4 kPa·s at $T_m$+30° C.

As shown in Table 2, one can further notice that Examples 1 and 2 had detectable levels of long-chain branches as characterized by an overall LCBF of greater than 0.001. As further shown in Table 3A, the second component in Examples 1 and 2 had a detectable level of long chain branches as confirmed by an LCBF$^2$ greater than 0.001. As shown in Table 3A, the first component in these Examples was LCB free (i.e., undetectable levels of LCB or LCBF$^1$<0.001).

As can be seen in Table 2, Examples 1 and 2 had a single peak in the CTREF analysis at 70.3 and 70.8° C. Table 3A summarizes SEC deconvoluted results for Examples 1 and 2; i.e., Examples 1 and 2 were deconvoluted into a first component (a high molecular weight component) and a second component (low molecular weight component). In Table 3A, attributes such as the weight fractions, molecular weights moments ($M_n$, $M_w$, $M_z$ and their ratios $M_w/M_n$), short-chain branching content (SCB per 1000 $CH_2$s), density and the melt index of the first component and the second component are disclosed. Table 3A discloses that $\Delta\rho$, $|\rho^1-\rho^2|$ or absolute value of (the density of the first component)−(the density of the second component), was 0.0014 and 0.0077 g/cm$^3$ for Example 1 and 2, respectively. A small $\Delta\rho$ value led to observation of a single elution peak in the CTREF analysis. Further, Table 3A shows that the weight average molecular weight of the second component $M_w^2$ and the weight average molecular weight of the first component $M_w^1$ had a ratio of 3.0 and 2.6 for Examples 1 and 2, respectively, satisfying inequality $2.0 \leq M_w^{HMW}/M_w^{LMW} \leq 4.0$.

In Table 3B, basic physical and molecular features of the first and second components in Comparative Example 1 are shown. As further shown in Table 3B, the first component (high molecular weight component) and the second component (low molecular weight component) in the Comparative Example 1 were produced using a bridged metallocene catalyst formulation comprising diphenylmethylene(cyclopentadienyl)(2,7-di-t-butylfuorenyl)hafnium dimethyl [(2,7- tBu$_2$Flu)Ph$_2$C(Cp)HfMe$_2$ leading to detectable level of long chain branches in both components; i.e., LCBF$^1$ and LCBF$^2$ are greater than 0.001.

Table 4 discloses the physical, molecular, thermal and rheological attributes of Comparative examples 1 through 7. Comparative Example 2 was a commercially available solution process ethylene/1-octene copolymers produced by NOVA Chemicals Corporation (Calgary, Alberta, Canada) SURPASS® FPs117-C, produced using the unbridged single site catalyst formulation in a first and a second reactor. Comparative Example 2 contained 0.43 ppm of Ti with no detectable amount of Hf. Comparative 3 was SCLAIR® FP112-A commercially available from NOVA Chemicals Corporation, Calgary, Alberta. FP112-A was an ethylene/1-octene copolymer produced in a solution polymerization process employing an in-line Ti-based Ziegler-Natta catalyst formulation. Comparative 3 contained 8.27 ppm of Ti with no detectable amount of Hf. Comparative 5 was MARLEX® D163 commercially available from Chevron Phillips Chemical Company. Comparative 5 contained less than 0.3 ppm of Ti and no detectable amount of Hf. Comparative 6 was EXCEED® 1012 HA commercially available from Exxon-Mobil Chemical Company. Comparative 6 contained no detectable amount of Hf and less than 0.1 ppm of Ti.

As shown in Table 4, Comparative Example 1 contained 1.76 ppm of Hf originated from the (2,7-tBu$_2$Flu)Ph$_2$C(Cp) HfMe$_2$ component of the bridged metallocene catalyst formulation injected into both R1 and R2 with no detectable amount of Ti. Comparative Example 4 was a commercially available ethylene/1-octene copolymers produced by Borealis AG under commercial name QUEO® 1001. QUEO 1001 is believed to be produced in a solution polymerization process employing one reactor. Comparative Example 4 contained 0.24 ppm of hafnium with no detectable amount of Ti. Comparative 7 was AFFINITY® PL 1840 commercially available from The Dow Chemical Company. Comparative 7 contained 0.33 ppm of titanium with no detectable amount of Hf.

Comparative Examples with detectable levels of LCB (LCBF>0.001; Comparative Examples 1, 4 and 7) had number-average relaxation times significantly larger than 15 ms at 190° C. and flow activation energy values greater than 45 kJ/mol. The slow relaxation process in these comparatives combined with their high temperature sensitivity (i.e., E$_a$>45 kJ/mol) have led to a number-average relaxation times ranging from about 100 to about 1000 ms at T$_m$+30° C. Without wishing to be limited by any theory, it should be noted that polyethylene compositions with slow relaxation modes ranging from about 100 to 1000 ms would not be desired in the sealant layer in a film structure as they would not reach a bulk-like state at the interphase within the time scale and operating temperature window of heat-sealing process.

Comparative Examples with undetectable levels of LCB (LCBF<0.001; Comparative Examples 2, 3, 5 and 6) had flow activation energy values smaller than 33 kJ/mol. One can notice that despite these Comparatives have comparable zero-shear viscosities at 190° C. with Examples 1 and 2, their zero-shear viscosity at T$_m$+30° C. was inferior compared to the inventive example less. This inferior zero-shear viscosity performance at temperatures in the melt-state, near the melting point, can lead a decreased resistance against peel stresses during the heat-sealing process while the sealed area is still hot.

Blown Films

Monolayer blown films were produced from ethylene interpolymer products of Example 1 and 2 and Comparative Examples on a Gloucester extruder, 2.5 inch (6.45 cm) barrel diameter, 24/1 L/D (barrel Length/barrel Diameter) equipped with: a barrier screw; a low pressure 4 inch (10.16 cm) diameter die with a 35 mil (0.089 cm) die gap, and; a Western Polymer Air ring. Blown films, 1.0 mil (25 μm) thick, were produced at a constant output rate of 100 lb/hr (45.4 kg/hr) by adjusting extruder screw speed; and the frost line height was maintained at about 16 to 18 inch (40.64 to 45.72 cm) by adjusting the cooling air. Blown film processing conditions for Examples 1 and 2 and Comparative Examples 3, 4 and 5 are disclosed in Table 5. Processing aid incorporated in a polyethylene masterbatch, was added to all resins prior to film extrusion; the processing aid added was DYNAMAR® FX 5920A (commercially available from The 3M Company, St. Paul, MN, USA).

As shown in Table 6, relative to all disclosed Comparative Examples, blown films produced from Examples 1 and 2 can be advantageously used in any film application where improved film puncture resistance is desired. This improved puncture performance is specially observed when Examples 1 and 2 are compared with the Comparative Example 1. The puncture resistance of a blown film produced from Example 1 and 2 was 56.7% and 65.4% higher relative to a blown film prepared from Comparative Example 1 produced using a bridged metallocene catalyst in a first reactor and second reactor in a solution pilot plant, respectively.

As summarized in Table 6, relative to Comparative Examples, blown films produced from Examples 1 and 2 can be advantageously used in any film application where improved film hexane extractables are desired, e.g. in food packaging applications. The hexane extractables of blown films prepared from Example 1 and 2 was 27.5% and 54.3% lower relative to a blown film prepared from the Comparative Example 1 produced using a bridged metallocene catalyst in a first and second reactors in a solution pilot plant, respectively.

The data shown in Table 6 further displays that blown films produced from Examples 1 and 2 featured improved (lower) haze values relative to Comparative Examples. The haze values of blown films prepared from Example 1 and 2 was 31.6% and 13.2% lower relative to a blown film prepared from the Comparative Example 1 produced using a bridged metallocene catalyst in a first and second reactors in a solution pilot plant, respectively. The haze values of blown films prepared from Example 1 and 2 was 80.2% and 74.8% lower relative to a blown film prepared from the Comparative Example 2 produced using an unbridged metallocene catalyst in a first and second reactors in a solution commercial plant, respectively.

TABLE 5

Blown Film Processing Conditions Targeting 1.0 mil (25 μm) Film and Output Rate of 100 lb/hr Prepared from Examples 1 and 2 and Comparatives 3 to 5.

|  | Ex. 2 | Ex. 1 | Comp. 3 | Comp. 4 | Comp. 5 |
|---|---|---|---|---|---|
| Blow-up Ratio | 2.5:1 | 2.5:1 | 2.5:1 | 2.5:1 | 2.5:1 |
| Layflat Width (in) | 15.7 | 15.7 | 15.7 | 15.7 | 15.7 |

TABLE 5-continued

Blown Film Processing Conditions Targeting 1.0 mil (25 μm) Film and Output
Rate of 100 lb/hr Prepared from Examples 1 and 2 and Comparatives 3 to 5.

|  | Ex. 2 | Ex. 1 | Comp. 3 | Comp. 4 | Comp. 5 |
|---|---|---|---|---|---|
| Frost Line Height (in) | 17 | 17 | 17 | 16 | 16 |
| Magnehelic (in-H2O) | 10.75 | 12.25 | 8 | 9.75 | 11.25 |
| Nip Pressure (psi) | 30 | 30 | 30 | 30 | 30 |
| Die mill gap (mils) | 35 | 35 | 35 | 35 | 35 |
| Die Diameter (in) | 4 | 4 | 4 | 4 | 4 |
| Nip Speed (ft/min) | 131 | 131 | 131 | 131 | 130 |
| Current (A) | 43 | 39 | 37 | 50.5 | 45 |
| Voltage (V) | 197 | 188 | 197 | 183 | 183 |
| Pressure (psi) | 4445 | 4062 | 3911 | 5250 | 4568 |
| Screw Speed (rpm) | 41 | 39 | 42 | 37 | 37 |

TABLE 6

Blown Film Physical Properties of Examples and Comparatives at
a Film Thickness of 1.0 mil (25 μm) Unless Indicated Otherwise.

|  | Ex. 1 | Ex. 2 | Comp. 1 | Comp. 2 | Comp. 3 |
|---|---|---|---|---|---|
| Gloss at 45° | 82 | 78 | 75 | 44 | 63 |
| Haze (%) | 2.6 | 3.3 | 3.8 | 13 | 7.2 |
| Hexane Extractables* (%) | 0.84 | 0.53 | 1.2 | 0.4 | 1.4 |
| Lubricated Puncture Resistance (J/mm) | 127 | 134 | 81 | 96 | 98 |
| Dart Impact (g/mil) | 594 | 889 | 641 | 528 | 709 |
| Elmendorf Tear MD (g/mil) | 197 | 180 | 137 | 263 | 331 |
| Elmendorf Tear TD (g/mil) | 456 | 427 | 270 | 458 | 576 |
| 1% Sec Modulus - MD (MPa) | 106 | 111 | 108 | 142 | 118 |
| 1% Sec Modulus - TD (MPa) | 105 | 118 | 107 | 144 | 138 |
| 2% Sec Modulus - MD (MPa) | 98.4 | 104 | 100 | 131 | 116 |
| 2% Sec Modulus - TD (MPa) | 96.5 | 108 | 99 | 132 | 127 |
| Tensile Strength at Break MD (MPa) | 52.5 | 47.1 | 37 | 62 | 47 |
| Tensile Strength at Break TD (MPa) | 44.2 | 46.1 | 46 | 50 | 57 |
| Elongation at Break MD (%) | 473 | 460 | 436 | 590 | 435 |
| Elongation at Break TD (%) | 736 | 725 | 770 | 825 | 777 |
| Tensile Yield Strength MD (MPa) | 6.5 | 6.8 | 6.1 | 8 | 8.4 |
| Tensile Yield Strength TD (MPa | 5.7 | 6.5 | 5.7 | 7.9 | 8 |

|  | Comp. 4 | Comp. 5 | Comp. 6 | Comp. 7 |
|---|---|---|---|---|
| Gloss at 45° | 69 | 84 | 54 | 68 |
| Haze (%) | 4.1 | 2 | 8.6 | 5 |
| Hexane Extractables* (%) | 0.5 | 0.4 | 0.3 | 0.3 |
| Lubricated Puncture Resistance (J/mm) | 100 | 95 | 84 | 87 |
| Dart Impact (g/mil) | 846 | 932 | 928 | 861 |
| Elmendorf Tear MD (g/mil) | 149 | 220 | 195 | 144 |
| Elmendorf Tear TD (g/mil) | 380 | 298 | 274 | 407 |
| 1% Sec Modulus - MD (MPa) | 102 | 227 | 149 | 93 |
| 1% Sec Modulus - TD (MPa) | 102 | 225 | 155 | 101 |
| 2% Sec Modulus - MD (MPa) | 98 | 187 | 127 | 88 |
| 2% Sec Modulus - TD (MPa) | 95 | 185 | 127 | 93 |
| Tensile Strength at Break MD (MPa) | 53 | 33 | 44 | 54 |
| Tensile Strength at Break TD (MPa) | 48 | 31 | 46 | 43 |
| Elongation at Break MD (%) | 543 | 453 | 557 | 517 |
| Elongation at Break TD (%) | 762 | 567 | 701 | 695 |
| Tensile Yield Strength MD (MPa) | 7.4 | 10 | 7.4 | 6.7 |
| Tensile Yield Strength TD (MPa | 7.3 | 10 | 7.1 | 7.8 |

*measured at a film thickness of 3.5 mil (89 μm)

Multilayer films were produced on a 9-layer line commercially available from Brampton Engineering (Brampton ON, Canada). The structure of the 9-layer films produced is shown in Table 7. Layer 1 contained the sealant resin under test. More specifically, layer 1 contained 91.5 wt. % of the sealant resin, 2.5 wt. % of an antiblock masterbatch, 3 wt. % of a slip masterbatch and 3 wt. % of a processing aid masterbatch, such that layer 1 contained 6250 ppm of antiblock (silica (diatomaceous earth)), 1500 ppm of slip (eurcamide) and 1500 ppm of processing aid (fluoropolymer compound); additive masterbatch carrier resins were LLDPE, about 2 melt index ($I_2$) and about 0.918 g/cc. Layer 1 was the inside layer, i.e., inside the bubble as the multilayer film was produced on the blown film line. The total thickness of the 9-layer film was held constant at 3.5 mil; the thickness of layer 1 was 0.385 mil (9.8 μM), i.e. 11% of 3.5 mil (Table 7). Layers 2 to 4 and 6 to 8 contained SURPASS® FPs016-C an ethylene/1-octene copolymer available from NOVA Chemicals Corporation having a density of about 0.917 g/cm³ and a melt index ($I_2$) of about 0.60 dg/min. Layers 4, 6 and 8 also contained 20 wt. % BYNEL® 41E710 a maleic anhydride grafted LLDPE available from DuPont Packaging & Industrial Polymers having a density of 0.912 g/cm³ and a melt index ($I_2$) of 2.7 dg/min. Layers 5 and 9 contained ULTRAMID® C40 L a nylon (polyamide 6/66) available from BASF Corporation having a melt index ($I_2$) of 1.1 dg/min. The multilayer die technology consisted of a pancake die, FLEX-STACK® Co-extrusion die (SCD), with flow paths machined onto both sides of a plate, the die tooling diameter was 6.3-inches, in this disclosure a die gap of 85-mil was used consistently, film was produced at a Blow-Up-Ratio (BUR) of 2.5 and the output rate of the line was held constant at 250 lb/hr. The specifications of the nine extruders follow: screws 1.5-in diameter, 30/1 length to diameter ratio, 7-polyethylene screws with single flights and MADDOX mixers, 2-Nylon screws, extruders were air cooled, equipped with 20-H.P. motors and all extruders were equipped with gravimetric blenders. The nip and collapsing frame included a DECATEX horizontal oscillating haul-off and pearl cooling slats just below the nips. The line was equipped with a turret winder and oscillating slitter knives. Table 8 summarizes the temperature settings used. All die temperatures were maintained at a constant 480° F., i.e. layer sections, mandrel bottom, mandrel, inner lip and outer lip.

End users often desire improvements and/or a specific balance of several film properties. In the packaging industry, there is a need to improve the heat seal and hot tack properties of films. For example, it is particularly desirable to improve the peak hot tack strength while maintaining, or improving, other film physical properties such as stiffness, toughness and optical properties. Specific hot tack properties are desired in high speed vertical and horizontal form-fill-seal processes where a product (liquid, solid, paste, part, etc.) is loaded and sealed inside a pouch-like package. For example, a high temperature hot tack is desirable such that the seal strength remains sufficient at elevated temperatures. Poor hot tack properties frequently limit packaging line product rate.

Table 9 discloses peak hot tack strength data for six 9-layer films, (i) to (vi), prepared from Examples 1 and 2 and Comparatives 1, 2, 4 and 7 in layer 1 as the sealant resin. As shown in Table 9, the peak hot tack strength of films (i) and (ii) is larger than films (iii), (v) and (vi) by at least 48%. Particularly, the peak hot tack strength is larger by 63.8% and 56.4% compared to film (iii) in the case of films (i) and (ii), respectively. This is surprising given the higher weight-average molecular weight of Examples 1 and 2 compared to Comparatives 1, 4 and 7 which is expected to delay the rate of interdiffusion. Without wishing to be limited by any theory, this observation can be attributed to the unique LCB placement in Examples 1 and 2 where the second component with a lower molecular weight made using a bridged metallocene catalyst had an LCBF>0.001 and the first component with a higher molecular weight made using an unbridged single site catalyst had and LCBF<0.001. This unique LCB placement in Examples 1 and 2, has led to a fast relaxation process (e.g., see $\tau_n$ at $T_m$+30° C.) in these compositions facilitating effective interfacial adhesion and a superior peak hot tack strength behavior compared to other sealant resins disclosed in Table 9 with detectable levels of long chain branches (i.e., LCBF>0.001). One can further notice that the presence of LCB species in Examples 1 and 2 has led to a fine-tuned relaxation process and thermorheological behavior enabling an improved peak hot tack strength and resistance against peel stresses in comparison with Comparative Example 2 (film structure iv) with undetectable LCB levels and a fast relaxation process.

TABLE 7

The Multilayer Film Structure (9-layers) used to Prepare 3.5 mil Blown Films, the Material (Sealant Resin) under Test was Placed in Layer 1.

| | % of 9-layer Structure | Materials and Weight % in Each Layer | | | |
|---|---|---|---|---|---|
| | | Material A | | Material B | |
| | | Material | wt. % | Material | wt. % |
| Layer 9 | 11 | C40 L | 100 | | |
| Layer 8 | 11 | FPs016-C | 80 | BYNEL 41E710 | 20 |
| Layer 7 | 11 | FPs016-C | 100 | | |
| Layer 6 | 11 | FPs016-C | 80 | BYNEL 41E710 | 20 |
| Layer 5 | 12 | C40 L | 100 | | |
| Layer 4 | 11 | FPs016-C | 80 | BYNEL 41E710 | 20 |
| Layer 3 | 11 | FPs016-C | 100 | | |
| Layer 2 | 11 | FPs016-C | 100 | | |
| Layer 1 | 11 | Test Material | 91.5 | Additive Masterbatches | 8.5 |

TABLE 8

Multilayer Film Fabrication Conditions.

| | All Temperatures in ° F. | | | | | | |
|---|---|---|---|---|---|---|---|
| Extruder/Layer | Feed Throat | Barrel Zone 1 | Barrel Zone 2 | Barrel Zone 3 | Barrel Zone 4 | Screen | Adaptor |
| Layer 9 (outside of bubble) | 100 | 455 | 480 | 480 | 480 | 480 | 480 |
| Layer 8 | 75 | 360 | 420 | 410 | 410 | 410 | 410 |
| Layer 7 | 75 | 360 | 420 | 410 | 410 | 410 | 410 |
| Layer 6 | 75 | 360 | 420 | 410 | 410 | 410 | 410 |
| Layer 5 | 100 | 455 | 480 | 480 | 480 | 480 | 480 |
| Layer 4 | 75 | 360 | 420 | 410 | 410 | 410 | 410 |
| Layer 3 | 75 | 360 | 420 | 410 | 410 | 410 | 410 |
| Layer 2 | 75 | 360 | 420 | 410 | 410 | 410 | 410 |
| Layer 1 (inside of Bubble) | 75 | 360 | 420 | 410 | 410 | 410 | 410 |

TABLE 9

Peak Hot Tack Force of 9-layer Films (i) to (vi) Prepared from
Examples 1 and 2 and Comparatives 1, 2, 4 and 7 in Layer 1.

| 9-layer Film | (i) | (ii) | (iii) | (iv) | (v) | (vi) |
|---|---|---|---|---|---|---|
| Layer 1 Sealant Resin | Ex. 1 | Ex. 2 | Comp. 1 | Comp. 2 | Comp. 4 | Comp. 7 |
| Layer 1 Sealant Resin $M_w$ (kg/mol) | 98.3 | 99.7 | 91.5 | 100.6 | 82.3 | 81.5 |
| Layer 1 sealant resin $E_a$ (kJ/mol) | 36.5 | 37.0 | 48.3 | 30.8 | 60.6 | 65.1 |
| Layer 1 Sealant Resin $t_n$ (ms) at $T_m + 30°$ C. | 39.2 | 42.2 | 424.4 | 25.9 | 288.8 | 485.4 |
| Layer 1 Sealant Resin $n_0$ (kPa.s) at $T_m + 30°$ C. | 37.9 | 44.4 | 285.5 | 23.1 | 210.2 | 407.1 |
| Layer 1 Sealant Resin LCBF (—) | 0.0013 | 0.0019 | 0.044 | <0.001 | 0.067 | 0.077 |
| 9-Layer film Peak Hot Tack Strength (N) | 15.4 | 14.7 | 9.4 | 11.4 | 9.9 | 9.7 |

INDUSTRIAL APPLICABILITY

The ethylene interpolymer products disclosed herein have industrial applicability in a wide range of flexible manufactured articles; non-limiting examples include heat sealable monolayer or multilayer packaging films.

The invention claimed is:

1. An ethylene interpolymer product comprising a first component with an undetectable level of long-chain branches quantified by a dimensionless Long Chain Branching Factor (LCBF) less than about 0.001 produced using a first homogeneous catalyst formulation and a second component with a detectable level of long-chain branches quantified by a dimensionless Long Chain Branching Factor (LCBF) greater than about 0.001 produced using a second homogeneous catalyst formulation, wherein said first component has a weight-average molecular weight higher than said second component, wherein said ethylene interpolymer product is characterized by:

(a) an Arrhenius type flow activation energy $E_a$ greater than or equal to 33 KJ/mol and less than or equal to 45 KJ/mol; and (b) a number-average relaxation time $\tau_n$ measured at 190° C. greater than or equal to 2 ms and less than or equal to 15 ms, wherein said number-average relaxation time is calculated using zero-shear viscosity $\eta_0$ at 190° C. in kPa·s and plateau modulus $G_N{}^0$ at 190° C. in MPa, according to $$\tau_n = \frac{\eta_0}{G_N^0};$$

wherein said ethylene interpolymer product has from about 0.003 part per million (ppm) To about 2.7 ppm of titanium originating from the first homogenous catalyst formulation; and from about 0.003 ppm to about 2.7 ppm of hafnium originating from the second homogeneous catalyst formulation wherein said residual catalytic metals are measured using neutron activation analysis.

2. The ethylene interpolymer product of claim 1, wherein said ethylene interpolymer product has a number-average relaxation time $\tau_n$ measured at 190° C. greater than or equal to 5 ms and less than or equal to 12 ms.

3. The ethylene interpolymer product of claim 1, wherein said ethylene interpolymer product has an Arrhenius type flow activation energy $E_a$ greater than or equal to 36 KJ/mol and less than or equal to 42 KJ/mol.

4. The ethylene interpolymer product of claim 1, wherein said ethylene interpolymer product has a detectable level of long-chain branches quantified by a dimensionless Long Chain Branching Factor (LCBF) greater than or equal to about 0.001 and less than or equal to about 0.005.

5. The ethylene interpolymer product of claim 1, wherein said second component has a detectable level of long-chain branches quantified by a dimensionless Long Chain Branching Factor (LCBF) greater than about 0.001 and less than or equal to about 0.05.

6. The ethylene interpolymer product of claim 1, wherein said ethylene interpolymer product has a melt index equal to or greater than 0.5 dg/min and less than 10 dg/min;

wherein melt index is measured according to ASTM D1238 (2.16 kg load and 190° C.).

7. The ethylene interpolymer product of claim 1, wherein said ethylene interpolymer product has a melt index equal to or greater than 0.5 dg/min and less than 6 dg/min; wherein melt index is measured according to ASTM D1238 (2.16 kg load and 190° C.).

8. The ethylene interpolymer product of claim 1, wherein said ethylene interpolymer product has a density equal to or less than 0.918 g/cm3 and equal to or greater than 0.897 g/cm$^3$ wherein density is measured according to ASTM D792.

9. The ethylene interpolymer product of claim 8, wherein said first component has a density $\rho^1$ and said second component has a density $\rho^2$ satisfying the inequality 0 g/cm$^3$≤|$\rho^2 - \rho^1$|≤0.018 g/cm$^3$.

10. The ethylene interpolymer product of claim 1, wherein said ethylene interpolymer product has a density equal to or less than 0.914 g/cm$^3$ and equal to or greater than 0.900 g/cm$^3$ wherein density is measured according to ASTM D792.

11. The ethylene interpolymer product of claim 1, wherein said first component has a $$\left(\frac{M_w}{M_n}\right)$$

from about 1.7 to about 2.8 and said second component has a $$\left(\frac{M_w}{M_n}\right)$$

from about 1.7 to about 2.8.

12. The ethylene interpolymer product of claim 1, wherein said ethylene interpolymer product has a polydispersity index $$\left(\frac{M_w}{M_n}\right)$$

greater than 2.2 and less than 5.

13. The ethylene interpolymer product of claim 1, wherein said first component has a weight-average molecular weight $M_w^1$ from about 120000 to about 160000 g/mol and wherein said second component has a weight-average molecular weight $M_w^2$ from about 35000 to about 65000 g/mol.

14. The ethylene interpolymer product of claim 13, wherein said first component $M_w^1$ and second component $M_w^2$ satisfy the inequality $2.0 \leq M_w^1/M_w^2 \leq 4.0$.

15. The ethylene interpolymer product of claim 1, wherein the ethylene interpolymer product shows a single elution peak in a CTREF analysis.

16. The ethylene interpolymer product of claim 1, wherein said first homogeneous catalyst formulation is an unbridged single site catalyst formulation.

17. The ethylene interpolymer product of claim 16, wherein said second homogeneous catalyst formulation is a bridged metallocene catalyst formulation.

18. The ethylene interpolymer product of claim 17, wherein said unbridged single site catalyst formulation comprises a component A defined by the Formula (I):

$$(L^A)_a M(PI)_b (Q)_n \tag{I}$$

wherein $L^A$ is selected from the group consisting of unsubstituted cyclopentadienyl, substituted cyclopentadienyl, unsubstituted indenyl, substituted indenyl, unsubstituted fluorenyl and substituted fluorenyl; M is a metal selected from titanium, hafnium and zirconium; PI is a phosphinimine ligand; Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphide radical which is unsubstituted or substituted by up to two $C_{1-8}$ alkyl radicals; wherein a is 1; b is 1; n is 1 or 2; and (a+b+n) is equivalent to the valence of the metal M.

19. The ethylene interpolymer product of claim 1, wherein said ethylene interpolymer product comprises from 2.5 to 10 mole percent of one or more than one α-olefin.

20. The ethylene interpolymer product of claim 19, wherein said one or more than one α-olefin is selected from the group consisting of $C_3$ to $C_{10}$ α-olefins.

21. The ethylene interpolymer product according to claim 20, wherein said one or more than one α-olefin is 1-hexene, 1-octene or a mixture of 1-hexene and 1-octene.

22. The ethylene interpolymer product of claim 1, wherein said ethylene interpolymer product is manufactured in a solution phase polymerization process.

23. The ethylene interpolymer product of claim 22, wherein said first component is made in a first solution polymerization reactor and said second component is made in a second solution polymerization reactor and wherein the first and second solution polymerization reactors are configured in parallel to one another.

24. A polyethylene film having a thickness of from 0.5 to 10 mil, comprising at least one layer comprising the ethylene interpolymer product of claim 1.

25. The polyethylene film of claim 24, wherein said film is characterized by a hot-tack peak strength from about 12 N to about 20 N, wherein hot-tack force is measured on a film specimen with a width of 1 inch (25.4 mm) over a temperature range of 80° C. to 170° C.

26. The polyethylene film of claim 24, wherein said film is characterized by a lubricated puncture resistance from about 100 J/mm to about 150 J/mm.

* * * * *